United States Patent [19]

Kamath

[11] Patent Number: 4,490,748
[45] Date of Patent: Dec. 25, 1984

[54] METHOD AND APPARATUS FOR ONE LINE DROPOUT COMPENSATION OF COLOR TELEVISION SIGNALS

[75] Inventor: Bantval Y. Kamath, San Carlos, Calif.

[73] Assignee: Ampex Corporation, Redwood City, Calif.

[21] Appl. No.: 463,181

[22] Filed: Feb. 3, 1983

Related U.S. Application Data

[63] Continuation of Ser. No. 285,894, Jul. 23, 1981, abandoned, which is a continuation of Ser. No. 133,042, Mar. 24, 1980, abandoned.

[51] Int. Cl.³ .................. H04N 9/491; H04N 5/94
[52] U.S. Cl. ................... 358/314; 358/21 R
[58] Field of Search .............. 358/314, 21 R, 31, 36, 358/38

[56] References Cited

U.S. PATENT DOCUMENTS

| | | | |
|---|---|---|---|
| 3,463,874 | 8/1969 | Hodge et al. | 358/314 |
| 4,032,966 | 6/1977 | Kenney et al. | 358/314 |
| 4,272,785 | 6/1981 | Fuhrer | 358/314 |

Primary Examiner—John C. Martin
Assistant Examiner—Erin A. McDowell
Attorney, Agent, or Firm—Ralph L. Mossino; Joel D. Talcott

[57] ABSTRACT

A method and apparatus for dropout compensation of composite color television signals is described in which both the luminance and chrominance components forming a dropout compensation signal are derived from the same portion of the original color television information signal without dropouts immediately preceding the dropout. One horizontal line of the color television signal without dropouts is continuously stored in a memory. When a dropout occurs, the stored television signal line is circulated in the memory. The length of delay of the chrominance component of the stored television signal is controlled from line to line in response to the phase of the color burst synchronizing component of the color television signal being compensated for dropouts. The length of delay of the luminance component of the stored television signal is controlled on consecutive lines in response to the horizontal line synchronizing component of the color television signal being compensated for dropouts. The respectively delayed chrominance and luminance components are combined to form a composite dropout compensation signal which is inserted in the original color television signal in place of a detected dropout.

13 Claims, 17 Drawing Figures

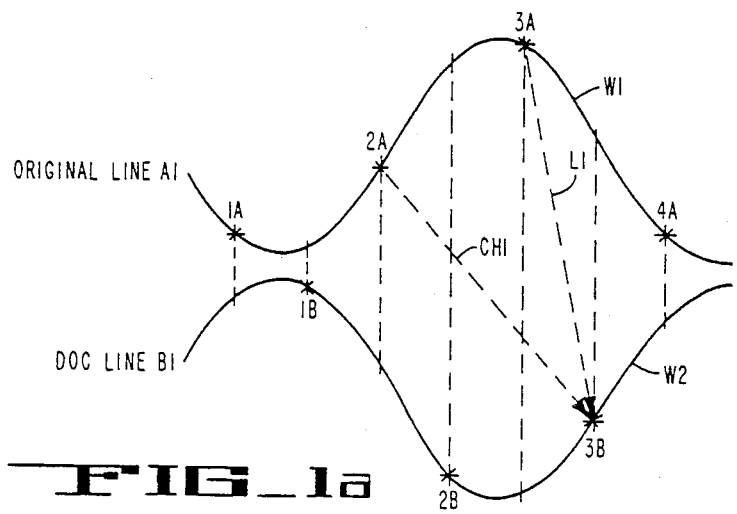
FIG_1a
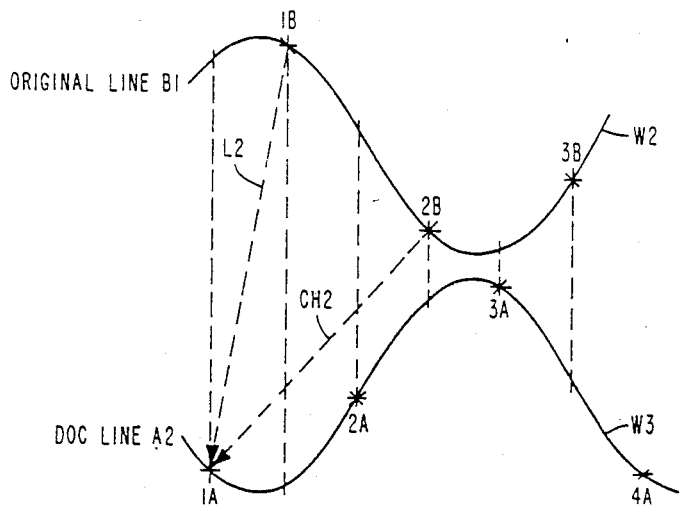
FIG_1b
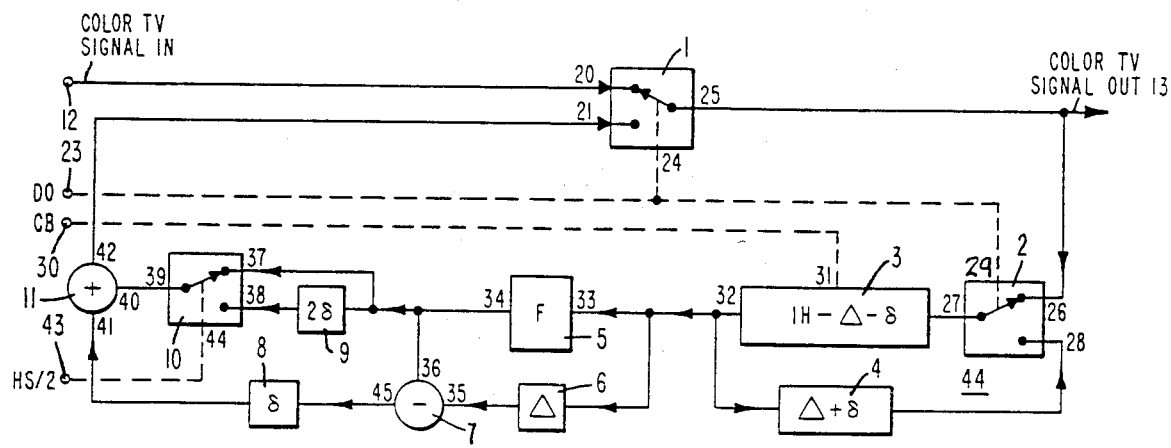
FIG_2

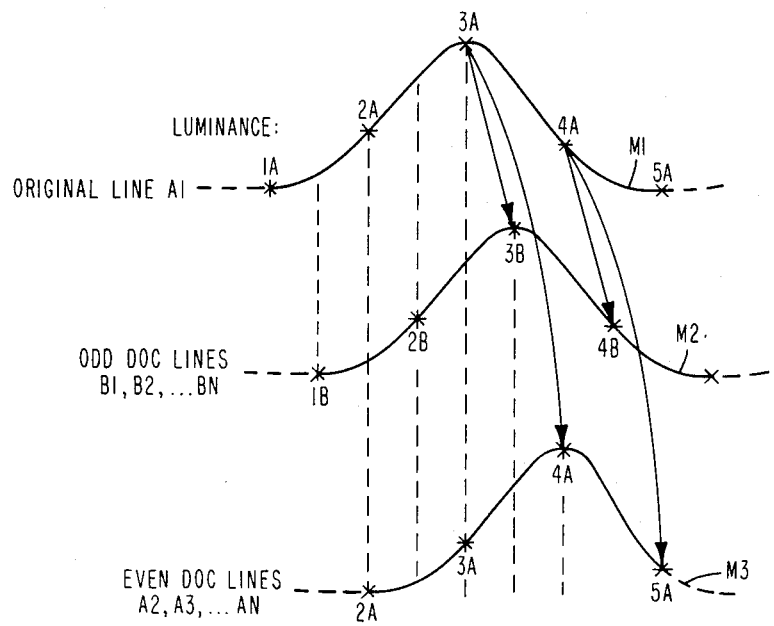
FIG_3a
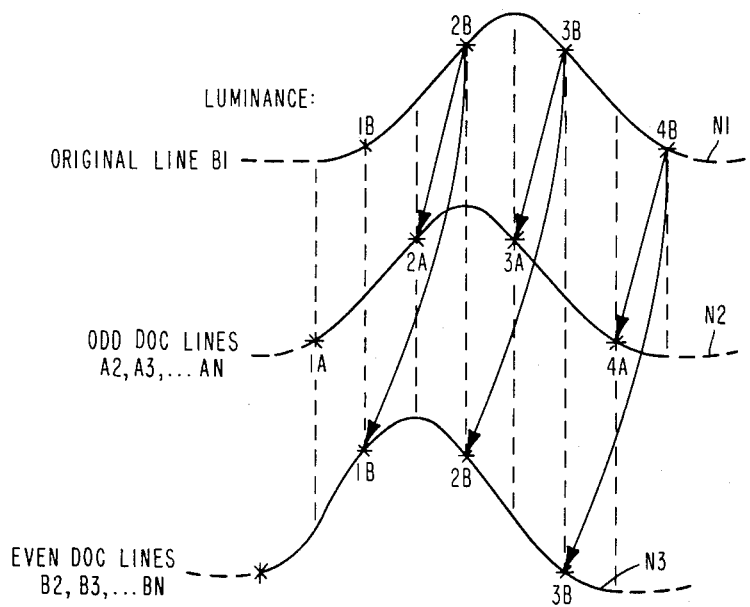
FIG_3b

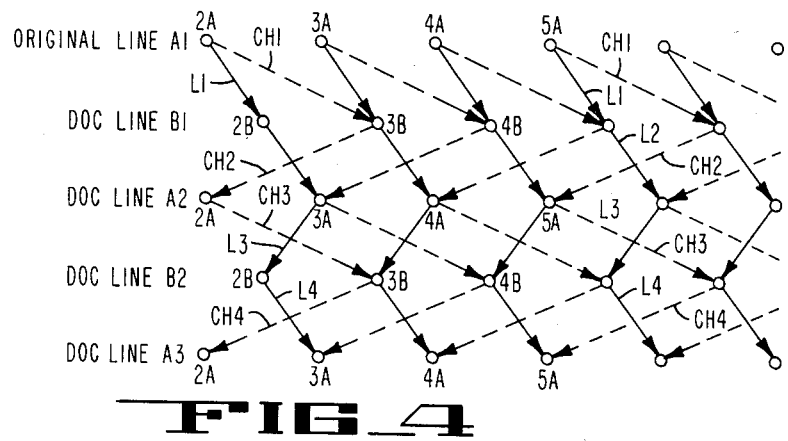
FIG_4
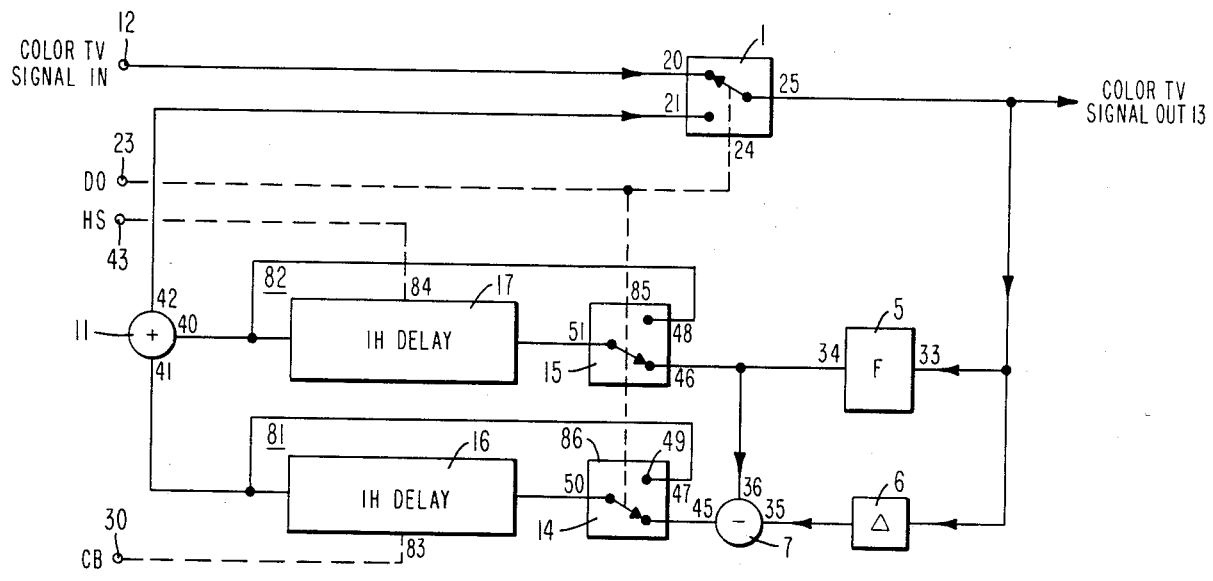
FIG_5
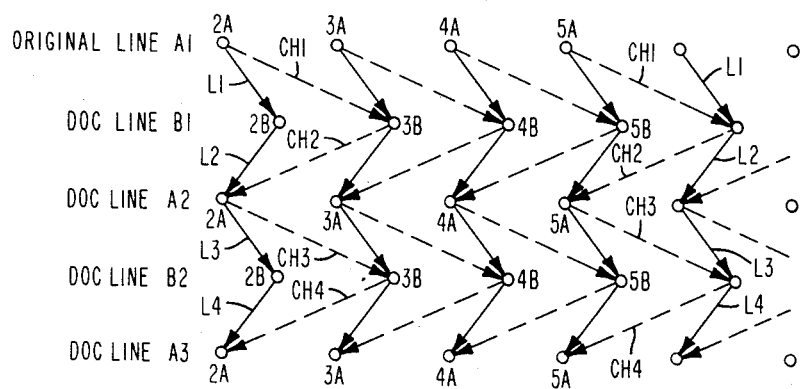
FIG_6

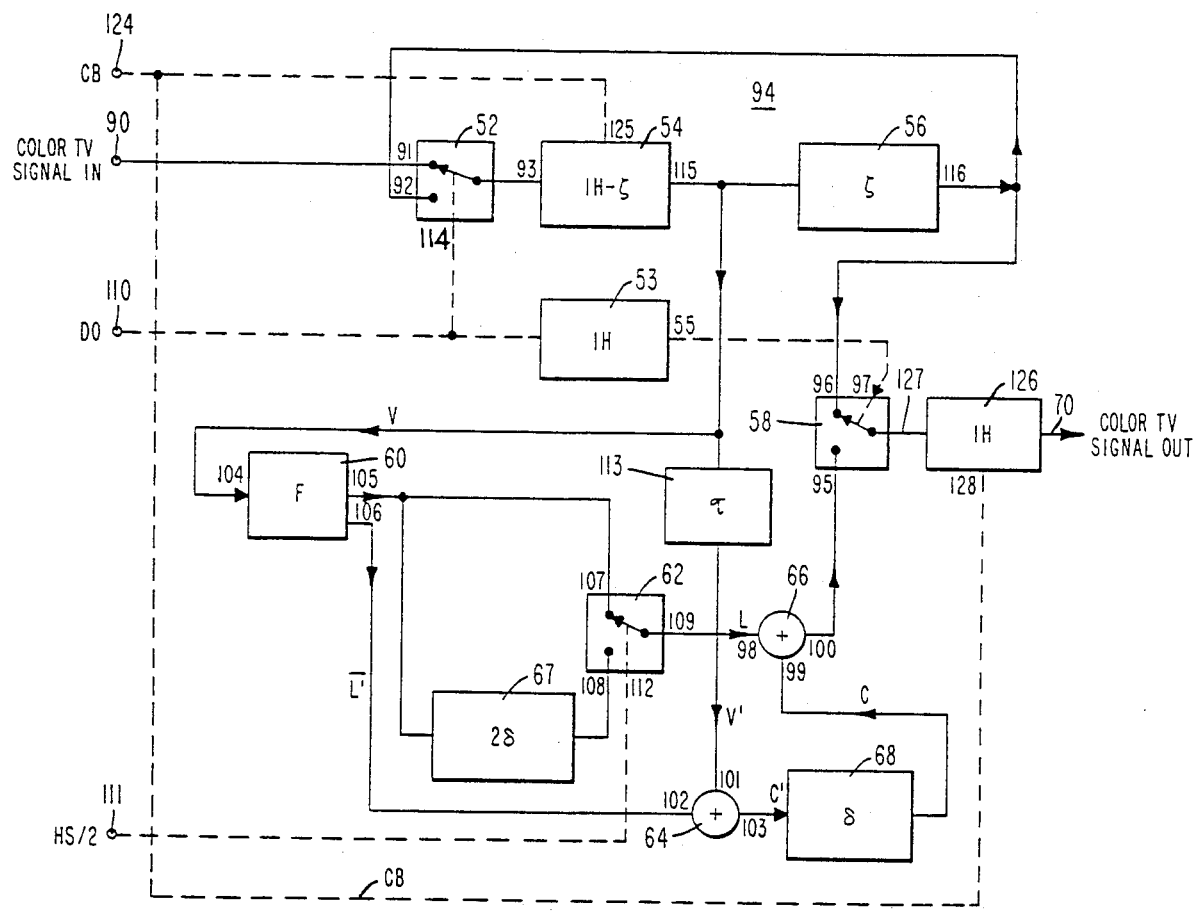
FIG_7

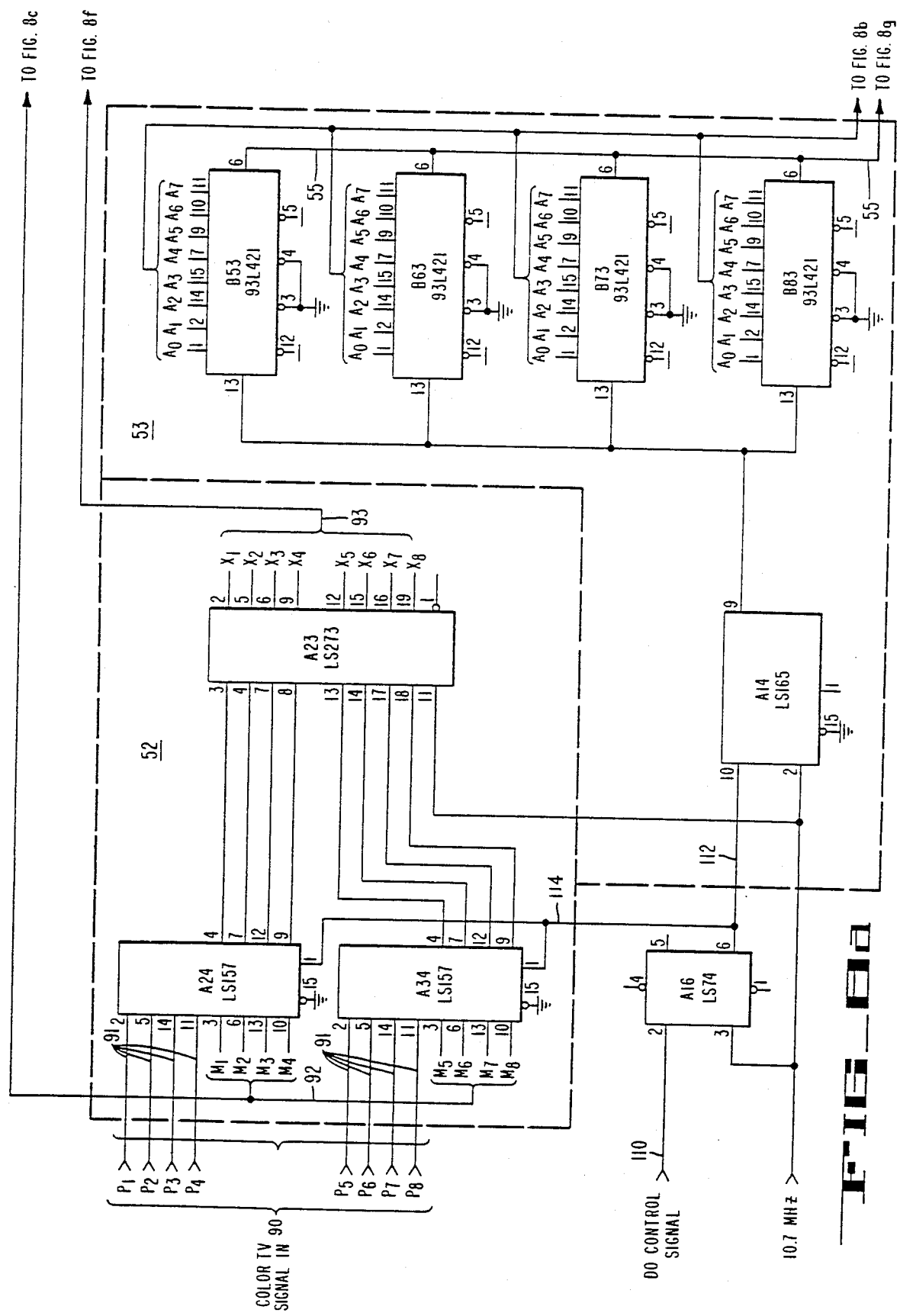

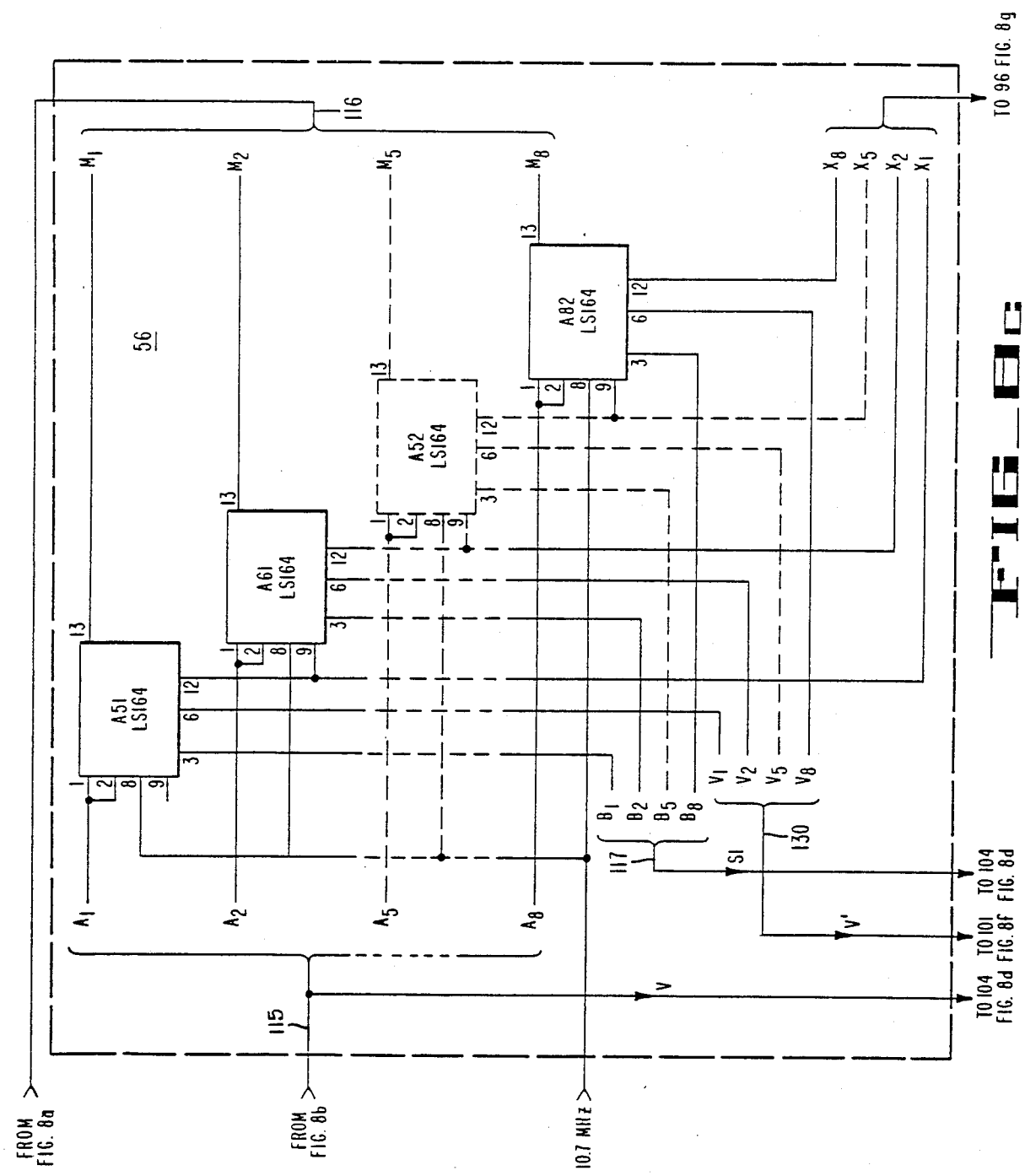

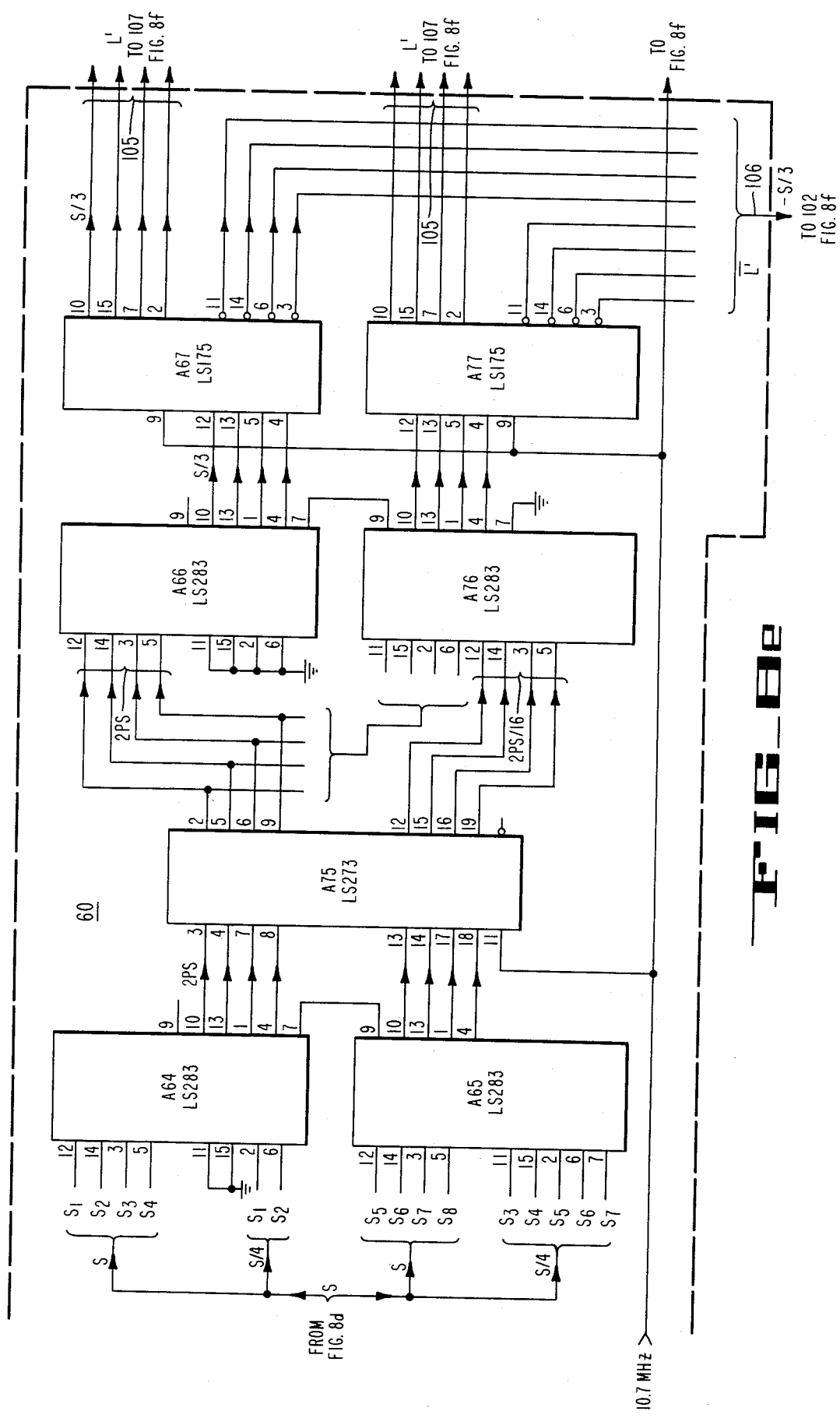

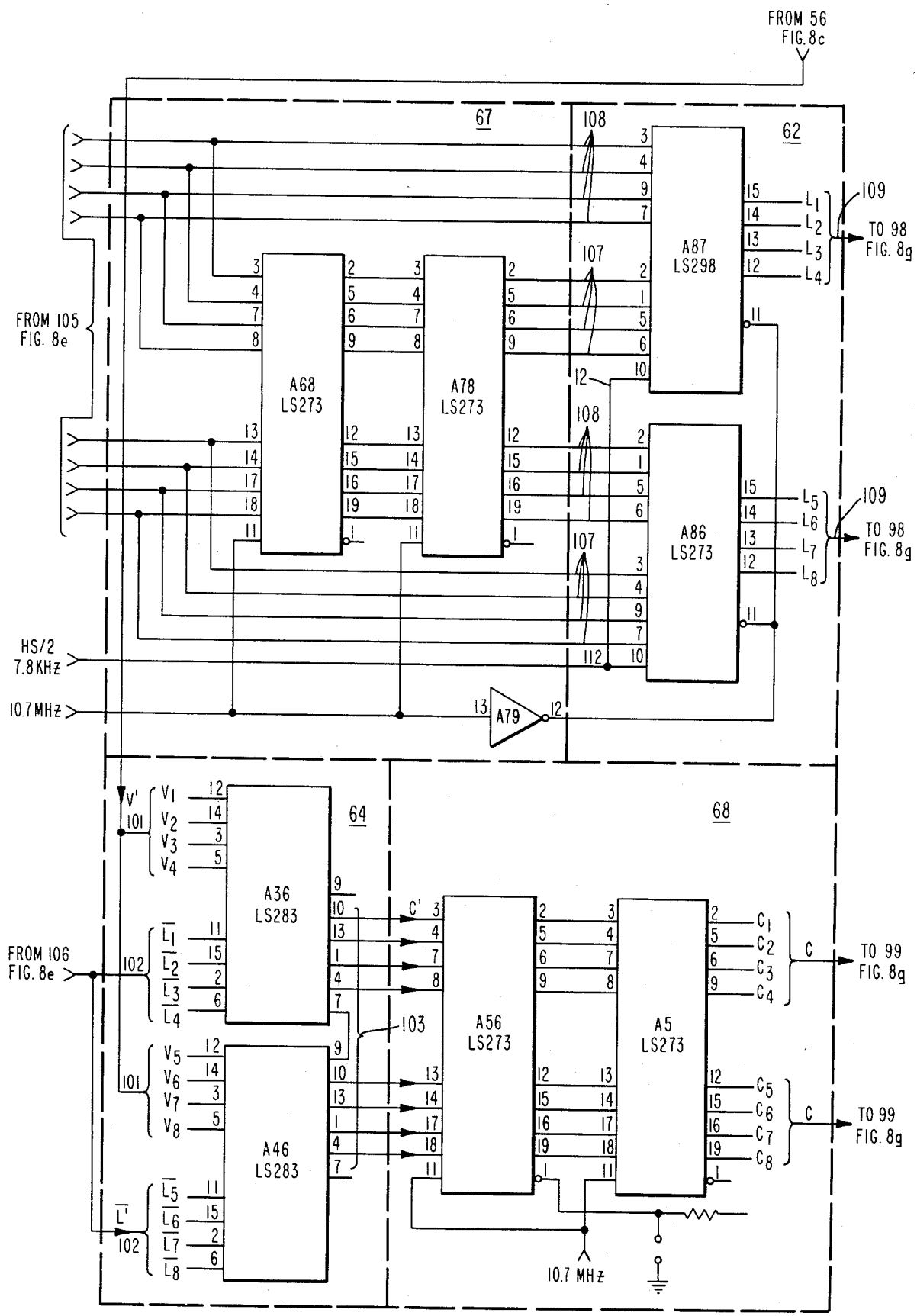
FIG_8f

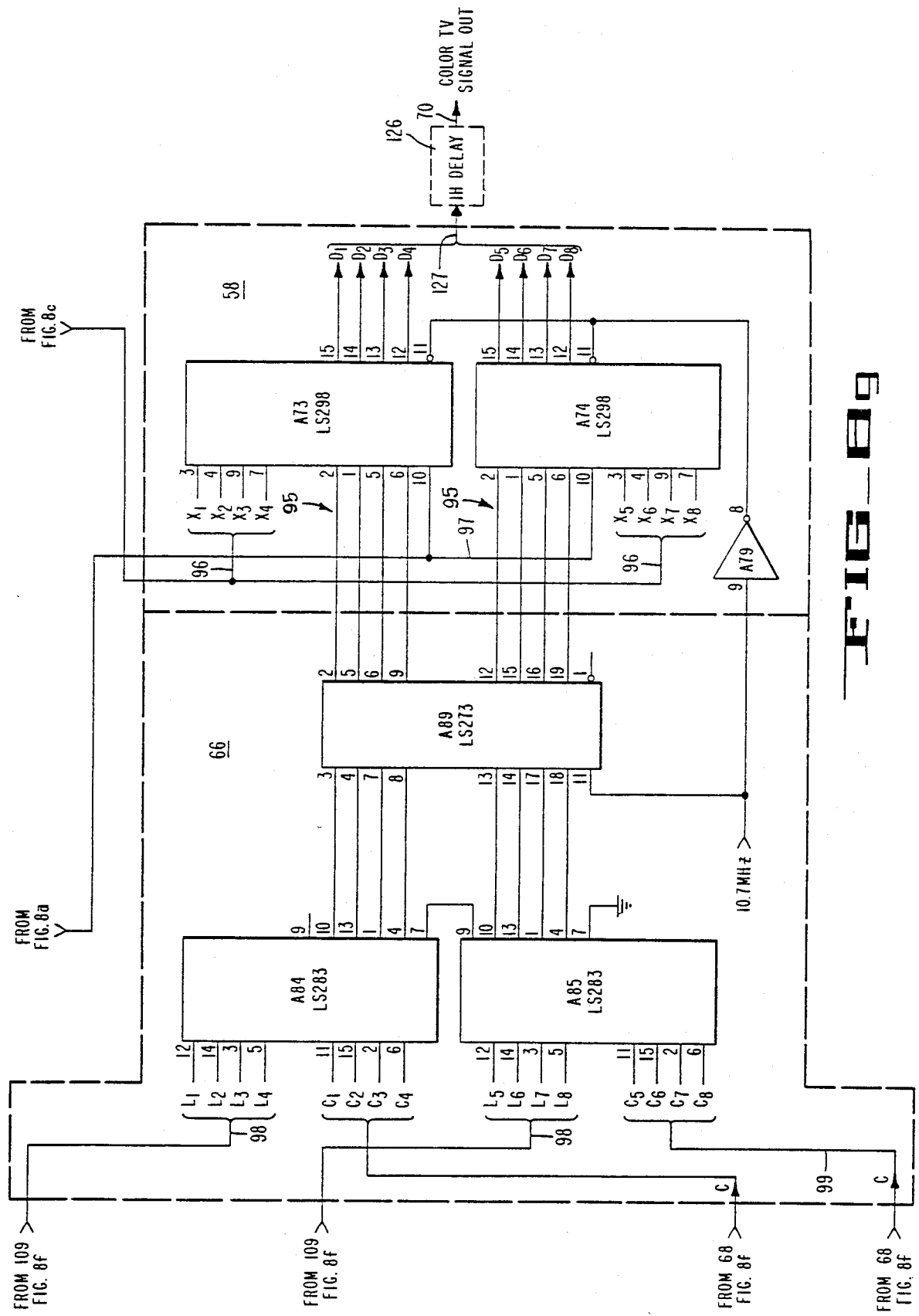

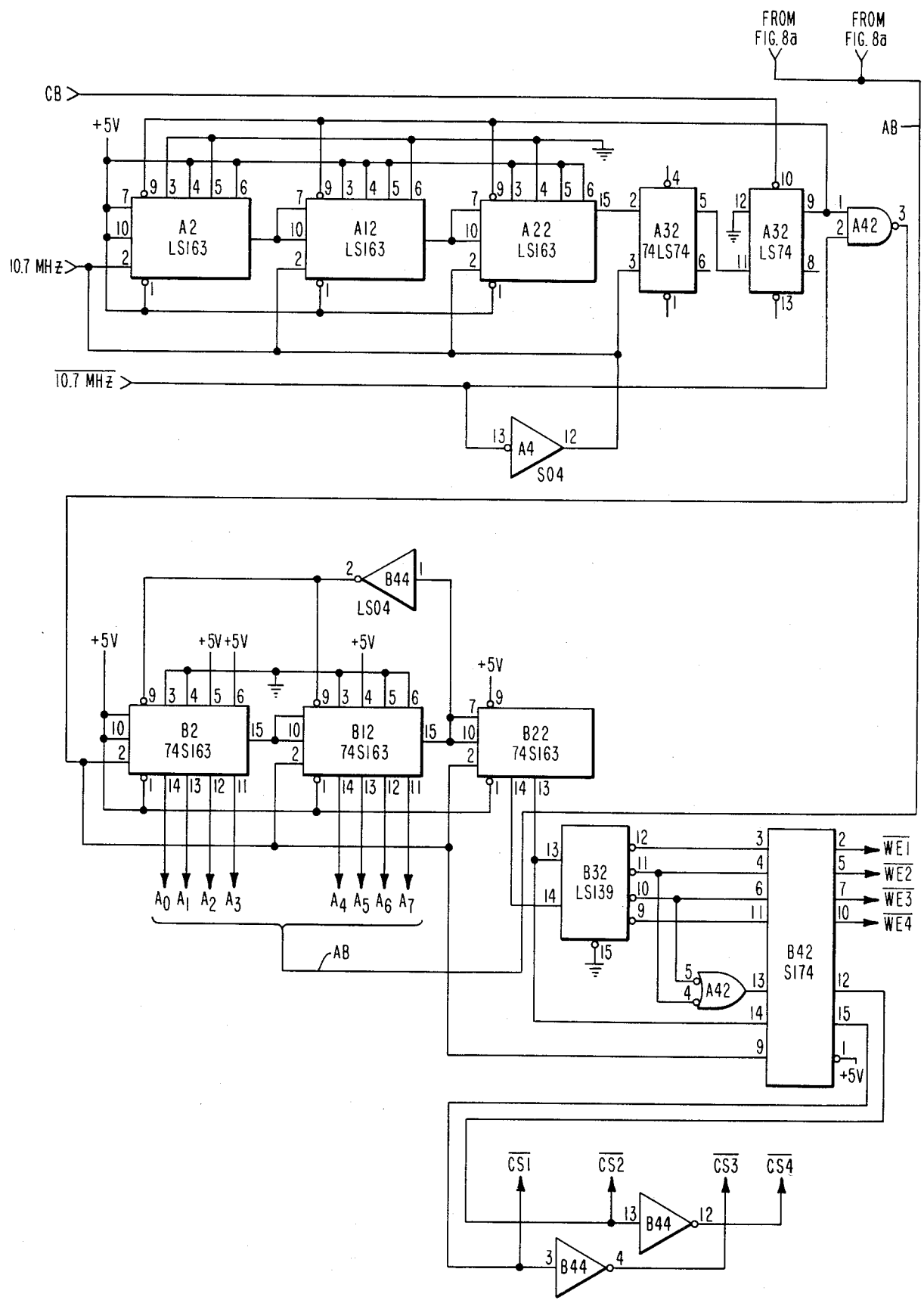
FIG_8h

METHOD AND APPARATUS FOR ONE LINE DROPOUT COMPENSATION OF COLOR TELEVISION SIGNALS

This is a continuation of application Ser. No. 285,894, filed July 23, 1981, now abandoned, which is a continuation of original application Ser. No. 133,042, filed Mar. 24, 1980 and now abandoned.

BACKGROUND OF THE INVENTION

The present invention relates to a method and apparatus for dropout compensation of color television signals where both the luminance and chrominance components forming the dropout compensation signal are delayed during consecutive horizontal line intervals for a time differing from one horizontal line period by less than one cycle of the color subcarrier component which suitable for utilization in both analog and digital signal systems.

As it is well known in the art, television signal dropout compensators are utilized to replace a missing or degraded portion of the television signal which has "dropped out" due to an unpredictable instantaneous malfunction of the system. For example, when the television signal is recorded and subsequently played back from a recording medium, a dropout may occur due to diminutive defects of the recording medium. When such dropouts in the television signal occur, they introduce subjective distortion in the displayed television picture. Dropout compensators are utilized to eliminate the subjective distortion of dropouts from the television picture displayed to the viewer.

A comprehensive survey of prior art television dropout compensators is contained in a copending U.S. patent application Ser. No. 88,719 by B. Yeshwant Kamath, entitled "A Digital Filter and System for Processing Digital Composite Signals Incorporating the Filter", filed on Oct. 26, 1979, now U.S. Pat. No. 4,251,831, which is assigned to the assignee of ths application, which describes a digital color television signal dropout compensator. Generally, prior art dropout compensators utilize an RF envelope level detector that monitors the amplitude level of the modulated television signal carrier waveform to detect dropouts in the television signal. A compensatable dropout is manifested in a television signal as a momentary substantial reduction in the amplitude or loss of the television signal. A delay line is utilized to continuously delay the incoming original television signal. When a dropout in the original signal is detected, the delayed signal is applied as a dropout compensation signal to replace the dropout portion of the television signal information. More specifically a switch in the color television signal path is controlled to apply the incoming color television signal, or the delayed dropout compensation signal, respectively, in response to a control signal from the dropout detector. The color television signal is delayed by one horizontal line period and the chrominance component is processed to have its phase selectively altered on consecutive television lines. For example, in NTSC television signal systems, phase adjustment of the separated chrominance component of the dropout compensation signal is provided by delaying the chrominance component by two television line periods, or, alternatively, the phase of the separated chrominance component is reversed on consecutive television lines in various ways well known in the art.

However, there is a significant disadvantage characterizing the aforedescribed prior art techniques of dropout compensation. The original color television signal is separated into a luminance and chrominance component and each component is respectively delayed and processed in a separate signal path. Then, the separately processed signal components are recombined for use as a dropout compensation signal. When two or more consecutive horizontal lines contain a dropout, the previously processed and recombined composite signal is again separated and processed, as above described. This re-separation and re-processing is repeated for each one of the consecutive lines containing a dropout. The re-separation and re-processing causes line-to-line distortion and progressive degeneration of the dropout compensation signal results. Thus, when utilizing the above described prior art dropout compensation techniques, the obtained dropout compensation signal may become unacceptable whenever a few consecutive lines of the color television signal contain dropouts.

SUMMARY OF THE INVENTION

Accordingly, it is an object of the present invention to provide a method and apparatus for dropout compensation of composite color television signals, in which the above-mentioned disadvantages are eliminated.

It is a further object of the present invention to provide a method and apparatus for color televison signal dropout compensation in which consecutive lines of the dropout compensation signal are derived from the same portion of the original color television information signal without dropout immediatey preceding the dropout.

It is another object of the invention to provide a dropout compensation method and apparatus in which the same portion of the original composite color television signal is stored in a memory, from which signal portion consecutive lines of a dropout compensation signal are derived and which stored original signal remains unchanged while the dropout compensation takes place.

It is still another object of the invention to provide a color television signal dropout compensation method and apparatus in which both the luminance and chrominance component of the original signal are delayed during consecutive horizontal line intervals for a time differing from one television line interval by less than one cycle of the color subcarrier component.

It is still a further object of the present invention to provide a method and apparatus for color television signal dropout compensation, suitable for use in both analog and digital color television signal systems.

Yet another object of the present invention is to provide a method and apparatus for dropout compensation of composite color television signals suitable for utilization, in known television signal systems, such as NTSC, PAL, PAL-M, etc.

It is still a further object of the present invention to provide a method and apparatus for dropout compensation of composite color television signals suitable for use in embodiments in which the signal is sampled at a frequency equal to an integral multiple greater than two of the color subcarrier signal frequency.

The foregoing and other objects are accomplished by the method of the present invention, according to which both the chrominance and luminance components of the composite color television signal are stored for a period of time equal to substantially one horiziontal line period, and the stored information is circulated in response to a dropout signal. The actual length of delay of the chrominance component is controlled in accordance with the phase of the color burst component of the television signal line to be compensated for dropouts to provide a delayed chrominance component, which is in phase with the color burst component contained in the incoming composite color television signal line to be compensated during consecutive horizontal line periods. The actual length of delay of the luminance component is controlled to provide a luminance component which is in synchronism with the horizontal line synchronizing component of the incoming composite color television signal during consecutive horizontal line periods. The respectively delayed chrominance and luminance components are combined to form a composite dropout compensation signal, which, in turn, is combined with the original composite color television signal to replace a dropout portion when it is detected.

The color television signal dropout compensator of the present invention has a circulating storage means for delaying both the luminance and chrominance components of an incoming composite color television signal to be used in forming a dropout compensation signal. A first control means, which is responsive to the color burst component, is utilized to control the actual delay of the chrominance component to provide a delayed chrominance component which is in phase with the color burst component contained in the incoming composite color television signal during consecutive horizontal line periods. A second control means, which is responsive to the horizontal line synchronizing component of the incoming composite color television signal, is utilized to control the actual delay of the luminance component to provide a delayed luminance component which is in synchronism with the horizontal line synchronizing component of the incoming composite color television signal. The delays of the stored luminance and chrominance components during consecutive horizontal line intervals differ from one horizontal line period by less than one cycle of the color subcarrier component of the color television signal. A signal combining means is utilized to combine the respectively delayed luminance and chrominance components to provide a composite dropout compensation signal. A switching means, responsive to the dropout control signal, selectively applies the incoming color television signal or the composite dropout compensation signal to an output of the dropout compensator.

Other objects, advantages and features of the present invention will become apparent from the following detailed description taken with reference to the accompanying drawings.

BRIEF DESCRIPTION OF THE DRAWINGS

FIGS. 1a and 1b illustrate a preferred method of providing a dropout compensation signal in accordance with the invention.

FIG. 2 is a functional block diagram of a preferred embodiment of the invention.

FIGS. 3a and 3b illustrate another preferred method in accordance with the invention.

FIG. 4 illustrates the operation of the apparatus of FIG. 2.

FIG. 5 is a functional block diagram of another preferred embodiment of the invention.

FIG. 6 illustrates the operation of the apparatus of FIG. 5.

FIG. 7 is a functional block diagram of a still further preferred embodiment of the invention.

FIGS. 8a to 8h are consecutive parts of a detailed electrical schematic diagram corresponding to the block diagram of FIG. 7.

DETAILED DESCRIPTION OF THE PREFERRED EMBODIMENTS

Figure 8B:
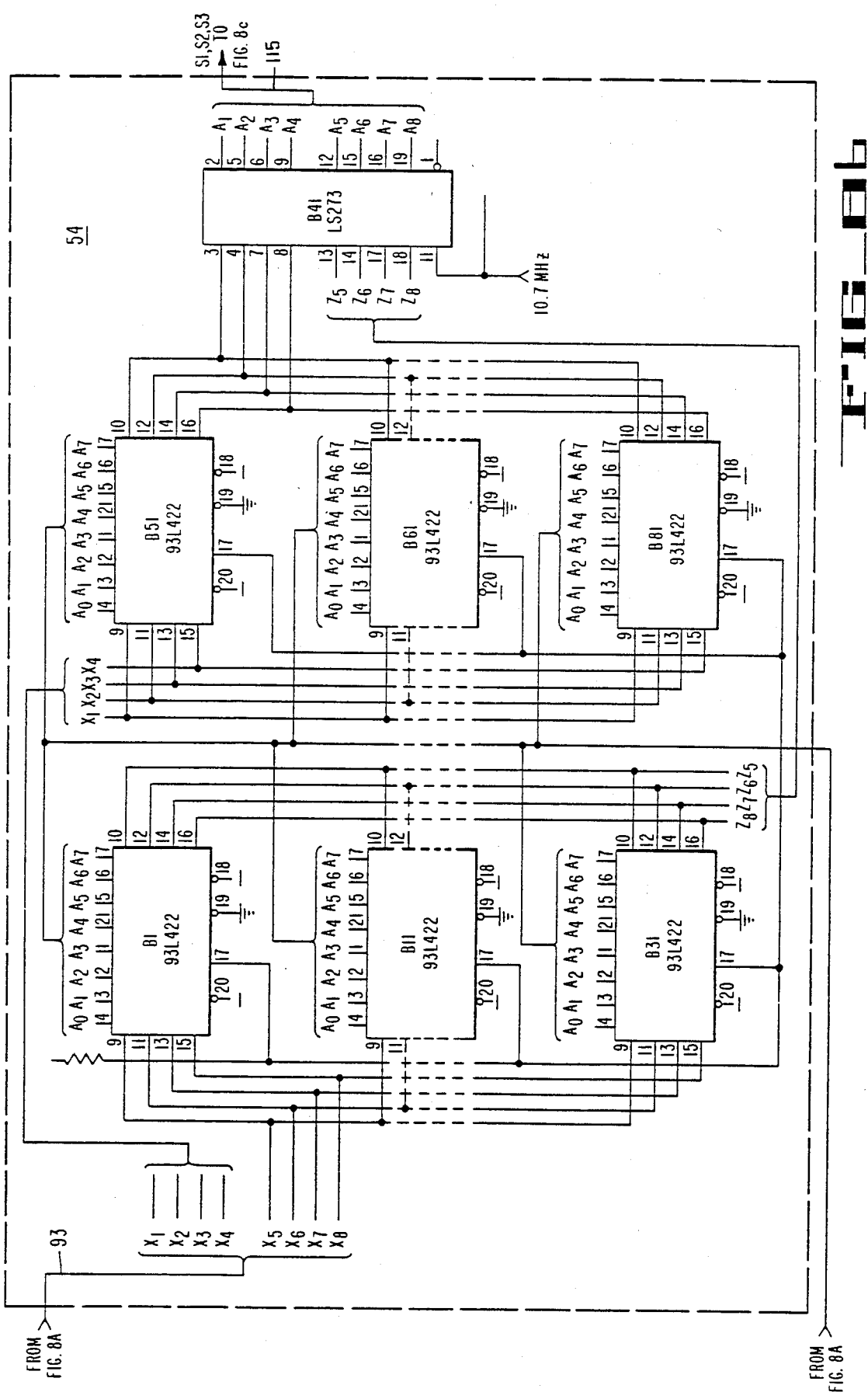

An example of a preferred dropout compensation method of the present invention will be described now with reference to FIGS. 1a and 1b. In the following description "dropout compensation" is sometimes referred to as "DOC" and "dropout" as "DO". In FIG. 1a, a sine wave W1 is shown representing a color subcarrier signal waveform typically found in the chrominance component of a composite color television signal. Waveform W1 is in the form of consecutive samples 1A, 2A, 3A, etc., at regularly spaced intervals of the incoming color television signal, using any color television signal sampling technique well known in the art. In this particular example, the samples are obtained by sampling an NTSC composite color television signal at a frequency equal to three times the color subcarrier signal frequency, that is, at $3 \times 3.58$ MHz or 10.74 MHz. The obtained samples may be encoded into a digital form by an analog-to-digital encoder, utilizing, for example, pulse code modulation (PCM), where each individual code element represents a particular signal amplitude value. As an example, the subcarrier waveform W1 is indicated as occurring during a particular television line interval A1. It is a well known feature of the NTSC television signal system that the subcarrier waveform W2 in a next subsequent television line interval B1 will have an opposite phase with respect to subcarrier waveform W1. Therefore, if a dropout occurs, for example, after the original television line A1 has been received and delayed by one television line period for subsequent utilization as a dropout compensation signal to replace a drop out occurring in line B1, the delayed line A1 would exhibit an undesired 180° phase shift with respect to B1. The undesired 180° phase shift is reflected in the samples 1A, 2A, 3A, etc., of the delayed W1 signal being displaced by one and one-half sampling intervals relative to the phase locations of the corresponding samples 2B, 3B, etc., of waveform W2. To replace a dropout in television line interval B1 with a dropout compensation signal derived from the immediately preceding television line interval A1, sample 1A has to be displaced with respect to corresponding sample 2B, and similarly, sample 2A with respect to sample 3B, etc., by one and one-half sampling intervals in order to maintain the proper line-to-line chrominance phase relationship.

By the preferred method of the present invention, the above-indicated phase shift of the color subcarrier signal on consecutive lines is obtained by storing the color television signal and alternatively increasing or decreasing the storage delay of the chrominance component of the television signal by a delay corresponding to one and one-half sample periods. This latter feature is illustrated in FIG. 1a, showing sample 3B of line B1 as being obtained by delaying the chrominance component of sample 2A of the immediately preceding original television line A1 by one horizontal line period, increased by one and one-half sample periods. A dashed line CH1 connecting corresponding samples 3B and 2A illustrates this feature. FIG. 1b shows the subcarrier waveform W2 of line B1, followed by waveform W3 of a next consecutive line A2. FIG. 1b illustrates an example where line B1 is the last received original television signal line and line A2 is the first line containing a dropout requiring compensation. As FIG. 1b reveals, sample 1A of the subcarrier signal waveform W3 is obtained by delaying the chrominance component of sample 2B of waveform W2 by one horizontal line period decreased by a time interval corresponding to one and one-half sample periods. Dashed line CH2, connecting corresponding samples 1A and 2B, indicates the latter feature.

However, when the above-described dropout compensation method is utilized, the luminance component of the dropout compensation signal will introduce subjective distortions in the display of the compensated color television signal if it is also displaced by ±one and one-half sample periods with respect to its phase position in the original color television signal line. A phase displacement of the chrominance component of ±one and one-half sample periods is not objectionable because chrominance information changes in a color television signal are ordinarily at a low rate, whereas to obtain a high quality color signal for dropout compensation it is essential to maintain the line-to-line phase of the chrominance component as close to the required phase as possible. On the other hand, such phase displacement of the luminance component is quite objectionable because it introduces too large of a line-to-line horizontal displacement of samples in the television signal with respect to the samples of original signal.

To eliminate the above-discussed drawback, the preferred dropout compensation method of the invention provides line-to-line adjustment of the luminance component displacement as follows.

When the chrominance component of the stored television signal is delayed one horizontal line plus one and one-half sample periods for dropout compensation, as depicted by FIG. 1a, the luminance component of the stored television signal is delayed one horizontal line plus one-half sample period. When a horizontal line of a television line is dropout compensated with information from an immediately preceding horizontal line, the horizontal displacement of the luminance component of the dropout compensation signal relative to the luminance component of the television signal being compensated is reduced from an objectional one and one-half sample periods to an acceptable one-half sample period. The foregoing is illustrated in FIG. 1a by dashed line L1 connecting samples 3B and 3A. Analogously, for obtaining the above reduction in the luminance component displacement, when the stored television signal is delayed one horizontal line less one and one-half sample periods, as depicted by FIG. 1b, the luminance component of the stored television signal is delayed one horizontal line less one-half sample period. This is illustrated in FIG. 1b by dashed line L2 connecting samples 1A and 1B. As will be appreciated from the foregoing, the horizontal displacement of the luminance component of the dropout compensation signal relative to the television signal being compensated is reduced to an acceptable one-half sample period, which is one-third of a cycle of the color subcarrier in the example, in all cases when a horizontal line of a television signal is compensated for dropouts with a dropout compensation signal derived from the immediately preceding horizontal line of the television signal. In addition, in both such cases the delay of the respective chrominance components of the dropout compensation signal, remains displaced by the desired one and one-half sample periods.

More specifically the above features of the preferred method of the present invention can be conveniently realized through the practice of the method as follows. One horizontal line of the incoming original composite color television signal is continuously stored in a memory. The memory is updated with a new horizontal line of the incoming television signal each time a received horizontal line contains no dropouts. The length of delay of the stored composite signal is controlled in accordance with the line-to-line phase of the color burst component of the original color television signal. The different exact delays of the chrominance component and luminance component are achieved by separating the composite signal into its luminance and chrominance components so that the length of delay of the luminance component can be modulated about a length of one horizontal line a different amount relative that of the chrominance component. The difference is an integral number of sample periods. With repect to the above-described particular example illustrated in FIGS. 1a and 1b, the stored chrominance component of the composite color television signal is delayed an interval equal to one horizontal line period modulated by ±one and one-half sample periods on consecutive lines. Besides that, the length of delay of the stored luminance component is modulated line-to-line by ±one-half sample period, in the same sense as the stored chrominance component, to reduce the line-to-line luminance component displacement.

To illustrate the foregoing, a preferred embodiment of the apparatus of the present invention will be described with reference to the functional block diagram of FIG. 2 of the attached drawings. A composite color television signal is received at input terminal 12 and is applied to first input 20 of a first two-way switch 1. In this particular example, the television signal is received in digital form obtained, for example, by encoding the color television signal into a well-known NRZ PCM code, as previously mentioned with reference to FIGS. 1a and 1b. A control signal, DO, indicating presence of a dropout is received by a control terminal 23, for example, from a conventional dropout detector (not shown).

A suitable dropout detector may be of a conventional carrier monitor type which provides a control signal when the RF envelope of the modulated television signal dropout is below a predetermened level, such as described, for example, in AVR-2 Videotape Recorder, Theory of Operation, Catalog No. 1809179-01, published November, 1977, by Ampex Corporation, pages 5-31 to 5-33. The control terminal 23 is coupled to a control input 24 of first switch 1, and, also, to control input 29 of a second switch 2. Output 25 of switch 1 is coupled to an output terminal 13 of the dropout compensator circuit, as well as to first input 26 of switch 2. The output 27 of switch 2 is coupled via a controlled delay line 3 and a compensating fixed delay line 4 to a second input 28 of switch 2. Elements 2, 3 and 4 form together a circulating memory cirucit 44, which will be described hereinafter in more detail. A control terminal 30, which receives a color burst synchronous control signal, CB, that controls the length of the controlled delay line 3 in a manner to be described in detail hereinafter, is coupled to a control input 31 of the controlled delay line 3. The output 32 of delay line 3 is coupled to an input 33 of a filter 5 and via a compensating fixed delay line 6 to a first input 35 of a differencing circuit 7. The compensating delay lines 4 and 6 are respectively utilized to compensate for circuit delays in the color television signal path, which will be described further hereinafter. An output 34 of filter 5 is coupled to a second input 36 of differencing circuit 7, as well as to a first input 37 of a third two-way switch 10. The filter's output 34 is also coupled via a fixed delay line 9 to a second input 38 of switch 10. A control terminal 43, receiving a control signal HS/2, is coupled to a control input 44 of a third switch 10. An output 39 of switch 10 is coupled to a first input 40 of a signal combining circuit 11. An output 45 of signal differencing circuit 7 is coupled via a fixed delay line 8 to a second input 41 of circuit 11. An output 42 of signal combining circuit 11 is coupled to a second input 21 of the first two-way switch 1.

It is to be realized that the above-described preferred embodiment of FIG. 2 as well as the respective embodiments of FIGS. 5 and 7 which will be described later, all represent respective digital dropout compensators in accordance with the present invention in which high speed digital data is processed. Consequently, the various elements shown in these respective functional block diagrams may be constructed using conventional digital circuits in which the high speed data is precisely clocked at the sampling frequency, equal to an integral number greater than two times the color subcarrier signal frequency, the various embodiments described herein being arranged to operate with a sampling frequency of the three times the NTSC color subcarrier signal frequency or $3 \times 3.58 \approx 10.74$ MHz, which clock signal is frequency and phase-locked to the color subcarrier component of the sampled television signal. In the further description, the terms sampling frequency and clock frequency will be used interchangeably. For simplicity of representation, the clock signal path is not shown in the above-indicated Figures, however, it is shown in the detailed electrical schematic diagram of FIGS. 8a to 8h, corresponding to the block diagram of FIG. 7, which detailed diagram will be described hereinafter.

Now the operation of the preferred embodiment of the invention shown in the block diagram of FIG. 2 will be described. A digital NTSC color television signal in the form of discrete data representing consecutive samples is continuously received at input terminal 12 and fed to first input 20 of switch 1. When dropout compensator system is in normal operation, that is, no dropout in the incoming signal is detected, switch 1 is in its first position as shown, receiving the input signal at 20 and simultaneously applying it via output 25 to output terminal 13 of the dropout compensator and via input 26 and output 27 of switch 2 to the controlled delay line 3. Delay line 3 has a length that is controllable ±one and one-half sample periods about a nominal delay equal to one horizontal line period less circuit delays in the color television signal path as will be disclosed hereinafter.

The delayed composite signal from delay line 3 is fed to filter 5 which may be, for example, of the type, disclosed in the U.S. Pat. No. 4,251,831, or alternatively, it may be a well known digital comb filter. Filter 5 separates the luminance component from the stored composite color television signal, in a manner well known in the art. The separated luminance component obtained at the output 34 of filter 5 is applied to input 36 of differencing circuit 7. The composite color television signal from output 32 of delay line 3 is applied via compensating fixed delay line 6 to the other input 35 of circuit 7. Differencing circuit 7 provides at its output 45 a difference signal of the two signals received at its respective inputs. The resulting difference signal represents the separated chrominance component of the stored color television signal. Delay line 6 compensates for the circuit delay provided by filter 5, in a manner well known in the art, to eliminate undesirable relative phase shifts in the respective signal paths of the signals subsequently processed in differencing circuit 7.

In the particular embodiment of the invention illustrated in FIG. 2, non-integral number of samples equal to $3 \times 227.5 = 682.5$ clock cycles is obtained within one horizontal line period, the color subcarrier frequency being equal to 227.5 times the horizontal line frequency in NTSC color television signals. The controlled delay line 3 has a length of delay equal to one horizontal line period represented by 682.5 clock cycles, less one clock cycle plus the following circuit delay, which is alterable by ±one and one-half sample periods. Loading and unloading of the samples into and from delay line 3, respectively, is controlled by the control signal CB received at terminal 30, which signal is derived from the color burst component of the incoming color television signal during each horizontal line in a manner well know in the art so that it is synchronous with such color burst component. The CB control signal is applied to control input 31 of delay line 3. As mentioned earlier, in this particular embodiment one cycle of the color burst corresponds to three sample periods defined by three clock cycles. Consequently, the relative line-to-line phase shift by 180° of the color burst component represents a delay of plus or minus $1\frac{1}{2}$ sample periods, that is plus or minus $1\frac{1}{2}$ clock cycles. As will become apparent from the following description the controlled delay line 3 is operated to provide alternative delays of the composite color television signal equal to $682\frac{1}{2} + 1\frac{1}{2} = 684$ clock cycles and $682\frac{1}{2} - 1\frac{1}{2} = 681$ clock cycles on consecutive lines, less the aforementioned one clock cycle and circuit compensation delays. The latter operation may be described as modulating the fixed length of delay of the composite color television signal stored in delay line 3 during consecutive television line periods by the phase of the color burst component. It will be understood that the average signal delay during several consecutive lines approaches $682\frac{1}{2}$ clock cycles, which is equal to the original one horizontal line period.

From the foregoing description it follows that delay line 3 of FIG. 2 is controlled by a control signal CB synchronous with the color burst component, which signal is received at terminal 30 to provide a delayed composite color television signal of one horizontal line whose color subcarrier component is in phase with the color burst component of a following horizontal line, as previously described in detail with respect to FIGS. 1a and 1b.

As previously disclosed with reference to FIGS. 1a and 1b, it is desirable that the luminance component samples of the dropout compensation signal be processed to minimize the horizontal displacement of respective sample positions on consecutive lines of the displayed television signal. Now, the line-to-line adjustment of the luminance component delay provided by the apparatus of FIG. 2 to achieve the foregoing will be described. As above described, in this preferred embodiment the luminance component is separated in filter 5 from the composite signal having a modulated delay. The length of delay of the delayed separated luminance component is further modulated by ±1 clock cycle in the opposite sense with respect to the chrominance component that is to be combined with the luminance component to form the dropout compensation composite color television signal. To this effect, the delayed separated chrominance component at the output 45 of differencing circuit 7 is delayed by additional one clock cycle by fixed delay line 8. At the same time, the delayed separated luminance component from filter 5 is directly applied to the first input 37 of two-way switch 10 while it is also applied via additional delay line 9 of two clock cycles to the second input 38 of switch 10. Switch 10 is controlled by the control signal HS/2 received at terminal 43, having a frequency equal to one-half horizontal line frequency. The switch 10 is responsive to the HS/2 signal to connect first and second inputs 37 and 38 to the output 39 on alternate horizontal lines, thereby alternating the delay of the luminance component between zero and two clock cycles on alternate horizontal lines. Signal HS/2 is derived from the horizontal line synchrononizing component contained in the incoming color television signal received at input terminal 12. In the respective preferred embodiments of the invention described herein, the control signal HS/2 is frequency and phase-locked to the horizontal line synchronizing component and the color burst component of the incoming color television signal. During dropout compensation, when the composite television signal is not received, the respective control signals CB, HS or HS/2 are generated synchronously with the respective synchronizing components of the missing television signal, utilizing a flywheel signal generator (not shown) frequency and phase-locked to the color television signal, in a manner well known in the art. As will be understood from the foregoing description, the resulting delay of the luminance component is modulated by ±one clock cycle delay relative to the chrominance component delay. By this latter feature the length of delay of the luminance component of the dropout compensation signal is adjusted on consecutive horizontal lines in response to the horizontal line synchronizing component to minimize line-to-line horizontal displacement of samples inserted in the output color television signal for dropout compensation.

The respectively delayed luminance and chrominance components are combined in adder 11 and the combined signals at the output 42 of adder 11 represent the composite dropout compensation signal applied to input 21 of first switch 1. The dropout compensation signal is continuously available to be utilized for dropout compensation in response to a dropout compensation control signal DO received at control terminal 23, as has been described previously.

Upon receiving a control signal DO at terminal 23, indicating that a dropout has occurred in the incoming television signal at terminal 12, switch 1 is controlled to switch from input 20 to 21, and switch 2 to switch from input 26 to 28. Consequently, switch 1 will apply to output terminal 13, the dropout compensation signal received at its input 21, which is provided by the circuit of FIG. 2 as above disclosed. On the other hand, switch 2 will close the circulating memory circuit 44, and, thus, effect circulation of the last received line of the television signal information from a previous horizontal line or set of previous horizontal lines without dropouts immediately preceding the dropout, which signal has been stored in delay lines 3 and 4. Consequently, the above-indicated original color television signal line will circulate in circulating memory 44 until the dropout is eliminated and the control signal DO at terminal 23 is discontinued. During the dropout compensation, the output signal at output 32 from the circulating memory 44 is processed by the dropout compensator circuit of FIG. 2 in the previously disclosed manner, instead of the incoming color television signal.

As above mentioned, the length of delay of controlled delay line 3 is decreased from the previously considered one horizontal line period to compensate for circuit delays in the processed composite signal path. Thus, if the delay provided by filter 5 in the separated luminance signal path is designated $\Delta$ and the additional one clock cycle delay provided in both the separated luminance and chrominance signal paths is designated $\delta$, then it will become apparent from the block diagram of FIG. 2 that to obtain an overall length of delay equal to one horizontal line period of the composite DOC signal, while not considering the above-described modulation of the delay by the respective control signals, delay line 3 must have its delay decreased by $\Delta+\delta$. Similarly, it will become apparent from the above disclosure that to provide a circulating memory 44 which has a length of delay equal to exactly one horizontal line period, it is necessary to re-insert the combined delays $\Delta+\delta$ in form of a fixed delay line 4 as shown between the output 32 and input 27 of delay line 3.

As it is seen from the foregoing description, it is a significant advantage of the invention that consecutive lines of the dropout compensation signal are derived from the same portion of the original color television signal without a dropout immediately preceding the dropout.

It is a further important advantage, that the composite signal is stored in the circulating memory in its original form, and remains unchanged by the line-to-line processing of the signal components throughout the dropout compensation. Consequently, no deterioration of the resulting dropout compensation signal occurs, as it takes place in the known prior art dropout compensators. At the same time, each sample of the dropout compensation signal chrominance component is processed to have the same phase as that of a corresponding sample of the incoming television signal, for which the dropout signal is formed, while the dropout compensation signal luminance component is processed to introduce a minimum horizontal displacement of samples on consecutive lines of the dropout compensation composite color television signal. Since in the above described example related to the operation of the block diagram of FIG. 2, a sampling rate of three times the color subcarrier signal frequency is considered, there is a line-to-line displacement of the dropout compensation signal sample equal to $1\frac{1}{2}$ sample periods of the chrominance component and just $\frac{1}{2}$ sample period for the luminance component. It is understood from the foregoing description that by the above-indicated respective line-to-line displacement of samples, the previously described objectives related to a high quality dropout compensation signal are achieved.

The operation of the apparatus of FIG. 2 for dropout compensation of a series of consecutive horizontal lines containing dropouts is illustrated in FIGS. 3 and 4. These Figures illustrate the line-to-line displacement of the luminance and chrominance components combined to form a series of dropout compensation signals from one stored horizontal line of a composite television signal without a dropout for use in consecutive lines of the DOC television signal. As seen in FIG. 4, a last received original television signal line A1, immediately preceding the series of dropouts, comprises consecutive samples 2A, 3A, 4A, 5A, etc. It is seen from FIG. 4 that the apparatus of FIG. 2 operates to delay the chrominance component forming each of the samples 2B, 3B, 4B, etc., of the first DOC line B1, as well as all subsequent odd DOC lines B2, B3, etc. relative to the phase position of such each chrominance component in the original line by an amount equal to an odd multiple of the interval of one horizontal line plus one and one-half sample periods. However, it is seen from FIG. 4 that the apparatus of FIG. 2 operates to delay such chrominance component again after circulation in circulating memory 44, on the second DOC lines A2 and all subsequent even DOC lines A3, A4, etc., by an amount equal to the interval of one horizontal line less one and one-half sample period. As a result of the operation of the circulating memory 44, each chrominance component forming each sample of the dropout compensation signal for even DOC lines A2, A3, etc., is delayed even multiples of the interval of one horizontal line. Consequently, the chrominance components of samples 3A, 4A, etc., on even DOC lines A2, A3, etc., are in phase with those of original line A1, however, displaced by 1½ sample periods with respect to an immediately preceding odd DOC line. On the other hand, the operation of the apparatus results in the displacement of the luminance component forming each sample of even DOC lines A2, A3, etc., by one sample period with respect to the original line A1, but each is displaced only by ½ sample period with respect to the luminance component of the same sample appearing in an immediately preceding odd DOC line. During the first odd DOC line B1, the apparatus operates to delay the luminance component forming each sample of the dropout compensation signal by an amount equal to the interval of one horizontal line plus one-half sample period. The operation of the circulating memory in cooperation with the operation of the third two-way switch 10 in alternately inserting a two clock cycle delay and no delay in the luminance component path on consecutive horizontal lines results in delaying the circulated luminance component of each sample forming the dropout compensation signal for even DOC lines, A2, A3, etc., relative to the phase position of such luminance component in the original line by an amount equal the interval of one horizontal line less one-half sample period, whereby such luminance component is positioned in phase within one-half sample period of its phase position in the original line A1. As a result of the above-described dropout compensation method shown in FIG. 4, a line-to-line displacement pattern of sample components is formed in the display of the compensated color television signal in which the displacements of chrominance and luminance components forming a dropout compensated sample point represented by lines CH2, L2; CH3, L3; CH4, L4; etc., connecting corresponding chrominance and luminance component samples of adjacent DOC lines, are in opposite directions horizontally from line to line. By this pattern, the desired respective line-to-line horizontal displacement of ±1½ sample periods of the chrominance component and of ±½ sample period of the luminance component is achieved.

The foregoing preferred method of the invention with respect to providing a delayed luminance component of the composite dropout compensation signal on consecutive television lines is illustrated in FIGS. 3a and 3b. In FIG. 3a a waveform M1 represents a portion of the luminance component of an incoming original color television signal line A1 received at terminal 12 by the dropout compensation circuit of FIG. 2, immediately preceding a line containing a dropout. Samples 1A, 2A, 3A, etc., of waveform M1 are obtained by sampling the color television signal at a frequency equal to three times the color subcarrier signal frequency, as described previously. When considering the above-described method of providing a dropout compensation luminance component employing the apparatus of FIG. 2, the luminance component of the first dropout compensation signal line B1, following the original television signal line without a dropout, is represented by M2 in FIG. 3a, which illustrates the dropout compensation signal line as it appears in a raster display of the television signal. It is seen that waveform M2 is a replica of the original waveform M1 with the exception of samples 1B, 2B, 3B, etc., of M2 being displaced by only one-half sample period in one direction, for example, to the right with respect to samples 1A, 2A, 3A, etc., of waveform M1. However, waveform M3 of the next consecutive line A2 which waveform is a replica of the original waveform M1, is displaced from M2 of line B1 by one-half sample period, but it is displaced from the original waveform M1 of line 1A by one sample period, as illustrated by FIGS. 3a and 3b by the location of the samples 2A, 3A, 4A, etc., on M3 with respect to the samples of the previous lines B1 and A1, respectively. The latter effect is not objectionable to the viewer, since only a one-half sample period displacement in the horizontal direction of the luminance component of a given DOC sample occurs from line-to-line in the displayed dropout compensated color television signal when a single horizontal line is used to compensate a series of consecutive horizontal lines containing dropouts. The above method allows forming a composite dropout compensation signal having its composite samples composed of chrominance component sample portions horizontally displaced in one direction, and luminance component sample portions horizontally displaced in the opposite direction with respect to the composite samples of the previous color television signal line. This pattern alternates on consecutive dropout compensation lines by changing the above directions to achieve an overall compensating effect, as has been described above with respect to FIG. 4.

FIG. 3b depicts the luminance component of an incoming original color telvision line B1 immediately preceding a dropout. Waveform N1 comprising samples 1B, 2B, 3B, etc., is identical to waveform M1 pertaining to line A1 of FIG. 3a, with the exception of having its samples 1B, 2B, etc., displaced by ½ sample period with respect to waveform M1. It will be seen from FIG. 3b, that N2 depicts respective waveforms of all the "odd" DOC lines A2, A3, ... AN following the original line B1. Similarly, N3 depicts all the even DOC lines B2, B3, ... BN following the original line B1. There is a difference between forming DOC luminance components on consecutive television lines, as shown in FIGS. 3a and 3b in that the luminance components of the samples forming the drop compensation signal for the "odd" lines are displaced with respect to the phase locations in the original line by one-half sample period and those forming the dropout compensation signal for the "even" lines are displaced with respect to the phase locations in the original line by one whole sample period in respectively opposite directions. The reason for the difference in the direction of the displacement of the samples forming the dropout compensation signal resides in the arbitrary nature of the control of the delay lines exercised by the control signals CB and HS/2. Should the incoming color television signal start with the control signals causing the delay line 3 to increase the delay by one and one-half sample periods while the third two-way switch 10 is conditioned to connect its output 39 to its input 37, the displacement of the samples follows the pattern depicted in FIG. 3a. However should the dropout compensation sequence start with the control signals causing the delay line 3 to decrease the delay by one and one-half sample periods while the third two-way switch 10 is conditioned to connect its output 39 to its input 37, the displacement of the sample follows the pattern depicted in FIG. 3b.

Another preferred embodiment of the dropout compensator in accordance with the present invention is shown in FIG. 5. In FIG. 5, circuit elements similar to those previously described with respect to FIG. 2 are designated by like reference numerals. Description of these elements with respect to FIG. 5 will be omitted to avoid undue repetition. In the dropout compensation circuit of FIG. 5, filter 5, which separates the luminance component from the composite color television signal, is coupled to the output 25 of the first two-way switch 1. The separated luminance component at the output 34 of the filter 5 is fed to input 36 differencing circuit 7, whose other input 35 is coupled to receive the color television signal from output 25 of switch 1, via compensating fixed delay line 6. The resulting separated chrominance component at the output 45 of differencing circuit 7 is coupled to a first input 47 of a second two-way switch 14. The output 50 of switch 14 is coupled via a first controlled chrominance delay line 16 which has its output coupled to a second input 49 of switch 14. The delay line 16 and switch 14 thus represent a first circulating memory circuit 81 for the separated chrominance component. The delay line 16 is controlled by the previously described control signal indicated CB received at control terminal 30 and applied to the control input 83 of the delay line. The separated luminance component at the output 34 of filter 5 is further coupled to a first input 46 of a third two-way switch 15, and it is coupled by output 51 of switch 15 via a second controlled luminance delay line 17 to a second input 48 of switch 15. It is seen that delay line 17 and switch 15 form a second circulating memory circuit 82 for the separated luminance component. The delay line 17 is controlled by a control signal indicated HS received at control terminal 43 and applied to the control input 84 of the delay line. A dropout control signal DO received at control terminal 23 is coupled to respective control inputs 24, 85 and 86 of switches 1, 15 and 14, respectively.

In operation, a dropout control signal DO, which indicates the presence of dropout in the incoming composite color television signal received at 12, activates all three switches 1, 14 and 15, respectively. In response to the receipt of a dropout control signal DO, switch 1 is conditioned to couple a dropout compensation signal from its input 21 to its output 25, which signal is provided by the circuit of FIG. 5. The above-indicated dropout compensation signal is formed as follows. During times when no dropout is detected, filter 5 continuously receives the digital color television signal present at input terminal 12 composed of samples of an analog television signal taken at a frequency equal to three times the color subcarrier signal frequency. The separated luminance component at the output 34 of the filter 5 is fed via switch 15 to the luminance delay line 17. Delay line 17 has a nominal length of delay equal to one horizontal line period and stores one horizontal line of the separated luminance component obtained from a horizontal line preceding the horizontal line of the color television signal then being received at terminal 12. The loading and unloading of the signal stored in delay line 17 is controlled by the control signal HS received at terminal 43. Signal HS is derived from the horizontal synchronizing component of the received color television signal and is synchronous therewith. With respect to the above feature, a separated luminance component is obtained which is delayed by one horizontal line period and, at the same time, which is coherent with the horizontal line synchronizing component during consecutive television lines.

Similarly, the chrominance delay line 16, which also has a length equal to one horizontal line period, continuously receives the separated chrominance component from differencing circuit 7, via switch 14. Thus, one horizontal line of the separated chrominance component will be stored in the chrominance delay line 16, which chrominance component is obtained from the same portion of the color television signal as the separated luminance component stored simultaneously in the luminance delay line 17. Loading and unloading of the chrominance component stored in delay line 16 is controlled by the control signal CB received at terminal 30, which signal is derived from the color burst synchronizing component of the color television signal received at terminal 12. By controlling the chrominance delay line 16 by the control signal CB, a separated chrominance component is obtained which is delayed by one horizontal line period, and at the same time, which is in phase with the color burst component during consecutive television lines.

As it is shown in FIG. 5, the respectively delayed separated luminance and chrominance components are combined in the signal combining circuit 11 and the combined signal at the output 42 of circuit 11 is fed to the second input 21 of first switch 1. The signal at input 21 represents the dropout compensation signal which is utilized by the apparatus of FIG. 5 when a dropout control signal DO is received.

When a dropout is detected, switches 14 and 15, controlled by signal DO, close the respective circulating memory circuits 81, 82. Consequently, the separated luminance and chrominance components circulate in their respective circulating memory circuits, synchronously, controlled by a clock signal at a frequency equal to three times the color subcarrier signal frequency in a manner described hereinbefore with reference to the dropout compensation embodiment illustrated in FIG. 2.

It follows from the above description, that the circuit of the preferred embodiment of FIG. 5 has an advantage with respect to the circuit of FIG. 2 in that it does not require additional modulation of the delayed separated luminance component with respect to the delayed separated chrominance component to reduce the line-to-line horizontal displacement of the luminance component samples. Instead, in the embodiment of FIG. 5, two separate circulating delay lines are provided, one delay line for the separated luminance component and another one for the separated chrominance component, respectively. Each delay line 16, 17 is controlled by a separate control signal CB or HS, respectively, to provide a signal component in synchronization therewith.

The operation of the embodiment of FIG. 5 is illustrated in FIG. 6, where the respective horizontal displacements between the luminance and chrominance component samples on consecutive dropout compensation lines is shown. To facilitate comparison with the previously described diagram of FIG. 4 and the related circuit of FIG. 2, the last received original color television signal line without a dropout, the consecutive dropout compensatin (DOC) lines, as well as consecutive samples of these respective lines are designated by like reference characters in the diagrams of FIGS. 4 and 6. It is seen in the diagram of FIG. 6 that the luminance component of each DOC sample 2B, 3B, 4B, etc., on odd DOC lines B1, B2, etc., is obtained by delaying the luminance component of a corresponding sample 2A, 3A, 4A, etc., of the original line A1 by one horizontal line period increased by one-half sample period. At the same time, the chrominance component of each above-indicated DOC sample 3B, 4B, etc., on odd DOC lines is obtained by delaying the chrominance component of a corresponding sample 2A, 3A of the original line A1 by one horizontal line period increased by one and one-half sample period. On the other hand, the luminance component of each DOC sample 3A, 4A, etc., on even DOC lines A2, A3, etc., is obtained by delaying the luminance component by an interval equal to one horizontal line period less one sample period and by an interval equal to one horizontal line period less one and one-half sample periods the chrominance component of the corresponding samples. Thus, in the operation of the preferred embodiment of the invention of FIG. 5, the relative line-to-line horizontal displacement of the DOC signal samples is $\pm\frac{1}{2}$ sample period for the luminance component and $\pm 1\frac{1}{2}$ sample periods for the chrominance component. However, it is an advantage of the preferred method of the invention depicted by FIG. 6 when comparing it to the method depicted by FIG. 4 that, when a sequence of consecutive horizontal lines are compensated for dropout from a single horizontal line provided by the dropout compensator, every other DOC line is in phase with the original television signal line with respect to both the luminance and chrominance conponents, and no horizontal displacement of samples takes place on these lines with respect to both luminance and chrominance components.

In the embodiment of the invention illustrated in FIG. 5, it is not necessary to have the color television signal sampled at a frequency equal to an integral multiple of the color subcarrier signal frequency, as is the case in the embodiment of FIG. 2. In the embodiment of FIG. 5, a sampling frequency equal to a rational number multiple of the subcarrier frequency may be utilized.

For the purpose of a more complete disclosure of the apparatus and method of the present invention, a further embodiment of the present invention is shown in the block diagram of FIG. 7. A corresponding detailed electrical schematic diagram is shown in consecutive FIGS. 8a to 8h. The embodiment of FIGS. 7 and 8a to 8h has been designed for a specific DOC apparatus in which a two horizontal line delay of the original color television signal is required. First, the block diagram of FIG. 7 will be described, followed by the description of the corresponding detailed circuit diagram illustrated in FIGS. 8a to 8h. In the embodiment of FIG. 7, a color television signal is received at an input terminal 90, in the form of consecutive digital samples at a frequency equal to three times the color subcarrier signal frequency. The received signal is applied to input 91 of a two-way switch 52 and via the switch's output 93 to a first controlled delay line 54, providing one horizontal line delay less circuit delays designated $\zeta$. The delayed color television signal V from output 115 of delay line 54 is applied via a second compensating fixed delay line 56 providing a delay equal to $\zeta$ to a second input 92 of switch 52. Thus, a circulating memory circuit 94 is formed by elements 52, 54 and 56, similarly as previously described with respect to the embodiments of FIGS. 2 and 5, respectively. A control signal CB is applied to a control input 125 of the delay line 54, which is received at control terminal 124. The CB control signal is similar to that described previously with respect to FIGS. 2 and 5, respectively. The color television signal V from delay line 54 is also applied via a third compensating fixed delay line 113 having a delay designated $\tau$ to a first input 101 of a signal differencing circuit 64, as a delayed signal V'. Signal V from the output of delay line 54 is also applied to input 104 of a digital filter 60. The digital comb filter described in the above-identified U.S. Pat. No. 4,251,831 may be employed as filter 60. Filter 60 separates the luminance component from the color television signal, in a manner described in the patent. The separated luminance component L' obtained at the output 105 of filter 60 is applied to a first input 107 of a second two-way switch 62 and it is also applied via a fixed two-clock cycle delay line 67 to a second input 108 of switch 62. An output 109 of switch 62 is connected to a first input 98 of a signal combining circuit 66. Thus, the delayed separated luminance component L is applied by switch 62 to signal combining circuit 66 either directly or delayed by additional two clock cycles indicated 2δ. Switch 62 is controlled at its control input 112 by a control signal designated HS/2 received at a control terminal 111. An inverted separated luminance signal component $\overline{L'}$ obtained at an inverting output 106 of filter 60 is applied to a second input 102 of the signal differencing circuit 64. Circuit 64 provides at output 103 a difference signal C' representing the separated chrominance component obtained as a difference between the delayed composite color television signal V' and the delayed separated luminance component $\overline{L'}$, respectively applied to the first and second inputs of the signal differencing circuit 64. In this preferred embodiment, the differencing circuit 64 is implemented as a signal adder and the separated chrominance component C' is obtained by adding the delayed composite signal V' and inverted separated luminance component $\overline{L'}$.

The separated chrominance component C' provided at output 103 of differencing circuit 64 is applied via a one-clock-cycle delay line 68 to one input 99 of signal adder 66. As previously mentioned, the other input 98 of signal adder 66 receives the separated luminance component L from the second switch 62. Signal adder 66 combines the received chrominance and luminance components into a composite color television signal at its output 100, which signal represents the color television dropout compensation signal. The dropout compensation signal is applied to a first input 95 of a third two-way switch 58. A second input 96 of switch 56 is coupled to receive the composite color television signal present at input terminal 90 via first switch 52, first controlled delay line 54 and second compensating delay line 56. A control input 97 of switch 58 is coupled to receive a dropout compensation control signal DO via a delay line 53 providing a one horizontal line delay. The latter control signal is received at input terminal 110 when a dropout in the incoming color television signal at terminal 90 is detected, for example, by a conventional dropout detector (not shown) of the kind previously described. The dropout control signal at 110 is also applied directly to a control input 114 of the first switch 52. An output 127 of switch 58 is coupled via a further controlled delay line 126 to an output terminal 70 of the dropout compensation circuit of FIG. 7. Delay line 126 provides a one horizontal line delay and is controlled by signal CB applied to its control input 128, simultaneously with and in the same manner as previously described with respect to controlled delay line 54.

Now the operation of the dropout compensation circuit of FIG. 7 will be described. When a dropout in the composite color television signal is detected, for example, by a conventional dropout detector (not shown), a dropout control signal DO received at terminal 110 is applied to switch 52 and to switch 58 via delay line 53 providing a one horizontal line delay. Switch 52 closes the circulating memory circuit 94 and, consequently, the last received horizontal line of the color television signal immediately preceding the dropout, which has been stored in delay lines 54 and 56, circulates in the memory circuit 94 via input 92 and output 93 of switch 52 at a clock signal frequency equal to $3 \times 3.58$ MHz $\simeq 10.74$ MHz. The clock signal which is utilized for clocking the respective circuit elements of FIG. 7 is not shown in the block diagram for better clarity of representation, but it is shown in the corresponding detailed schematic diagram of FIGS. 8a to 8h, which will be described hereinafter. Filter 60 receives the composite signal V, delayed by one horizontal line period less circuit delay compensation, from the circulating memory 94 and separates the luminance component L' therefrom in a manner described in the above-referenced U.S. Pat. No. 4,251,831. The separated luminance component is applied via switch 62 to signal combining circuit 66 which is implemented in the preferred embodiment as a signal adder. Switch 62, in response to the control signal HS/2, alternatively applies the separated luminance component L', directly or delayed by two additional clock cycles in delay line 67, to signal combining circuit 66. The control signal HS/2 has a frequency of one-half of the horizontal line frequency. It is derived from the horizontal synchronizing component of the color television signal coupled to terminal 90. The phase of signal HS/2 is controlled by signal CB received at terminal 124 to assure that the same phase-relationship of these two control signals will be maintained during the entire operation. Thus, switch 62 is controlled by the signal HS/2 to alternatively apply, during consecutive horizontal lines, the luminance component signal L', undelayed and delayed by two clock cycles $2\delta$, respectively, to input 98 of adder 66. On the other hand, as previously described, signal adder 64 receives both the delayed composite signal V' and the inverted luminance component $\overline{L'}$ and provides a separated chrominance component C' at its output 103. To compensate for the circuit delay $\tau$ effected by processing the separated luminance component in filter 60, signal V' is delayed by $\tau$ in the third fixed compensating delay line 113. The separated chrominance component C' is delayed by one clock cycle $\delta$ in delay line 68 and the delayed chrominance component C is combined with the above-described luminance component L in signal adder 66.

As will be appreciated from the foregoing description with respect to FIGS. 3 and 4, alternately delaying and not delaying the separated luminance component L' by additional two clock cycles on the occurrence of alternate horizontal line periods, and delaying the separated chrominance component by an additional one clock cycle during consecutive horizontal line periods, and combining such components in adder 66, results in the generation of a composite dropout compensation signal, whose luminance component delay is modulated by $\pm 1$ clock cycle with respect to the chrominance component delay during consecutive horizontal line periods. Thus, the previously mentioned feature of the invention related to decreasing the luminance component delay with respect to the chrominance component delay of the resulting dropout compensation signal is achieved in the preferred embodiment of FIG. 7 by the above-described combination of circuit elements.

It will become apparent from the above-description of the block diagram of FIG. 7, that delay $\tau$ compensates for the delay in the filter circuit 60 and that delay $\zeta$ compensates for the combined delays $\tau$ and delay $\delta$ provided by delay line 68; thus, $\zeta = \tau + \delta$, when considering that circuits 64 and 66 have no significant circuit delays.

It will also become apparent with respect to FIG. 7 that in this particular preferred embodiment and controlled delay line 54 is coupled in the main composite color television signal path. Therefore, when no dropout compensation takes place, the incoming composite signal received at 90 is continuously delayed in delay lines 54 and 56 by one television line period, which delay is controlled by a clock signal that is synchronous with the color burst component contained in the incoming television signal. Thus, the original composite signal at the output 127 of switch 58 exhibits an undesired $\pm 180°$ phase shift on alternative lines relative to the reference timing associated with the main composite color television signal path. To compensate for this effect, an additional delay line 126 providing a one horizontal line delay is coupled in the main color television signal path at the output 127 of switch 58. The loading and unloading of delay line 126 is controlled by the above-described control signal CB received at control terminal 124 and applied to control input 128 of delay line 126. Since the color television signal received by delay line 126 has been previously delayed by one horizontal line period in delay lines 54 and 56, and both delay lines 54 and 126, respectively are controlled by the same signal CB, respective phase shifts of $\pm 180°$ in opposite sense are effected on respective output signals of these controlled delay lines 54 and 126. Consequently, these opposite phase shifts cancel, and no adverse phase shift is present in the output signal at output 70 of the dropout compensation circuit of FIG. 7.

In the dropout compensator embodiment of FIG. 7, the dropout compensation signal at the output terminal 70 is delayed by three horizontal line periods from the time it appeared at input terminal 90 to the time it appears at the output terminal 70 as the dropout compensation signal. This delay consists of the one horizontal line period delay resulting from the initial passage through the memory circuit 94 before the dropout being compensated is detected. After the dropout is detected, the horizontal line is again circulated through the memory circuit 94 before the switch 58 receives and responds to the delayed control signal DO to couple to dropout compensation signal formed from the recirculated horizontal line to the output 127. This adds a second one horizontal line to period delay to the dropout compensation signal. The third one horizontal line period delay results from the presence of the delay line 126. The three horizontal line delay is needed to satisfy the specific requirements of a particlar apparatus in which this particular embodiment of the invention is utilized. However, the actual dropout compensation signal obtained at output 127 of switch 58 is still formed from the last received original television signal line at input 90, substantially in the same manner as that previously described with respect to FIGS. 2 and 5.

It is noted, however, that the previously described respective embodiments of FIGS. 2 and 5 do not have their respective controlled delay lines coupled in the main composite color television path and, therefore, they do not exhibit an undesired phase shift such as provided by the embodiment of FIG. 7 during normal system operation when no dropout compensation is provided.

The detailed circuit diagram shown in consecutive FIGS. 8a to 8h essentially corresponds to the previously described simplified block diagram of FIG. 7. To facilitate comparison, individiual circuits in the detailed diagram corresponding to elements of the block diagram are delineated by dashed lines and designated by like reference numerals. Similarly, connecting lines between the circuits of the detailed diagram are designed by reference numerals corresponding to input/output designations of corresponding blocks of FIG. 7. For the purpose of complete disclosure, the integrated circuit components shown in the preferred embodiment of FIGS. 8a to 8h are designated by respective part numbers commonly used by manufacturers.

Figure 8D:
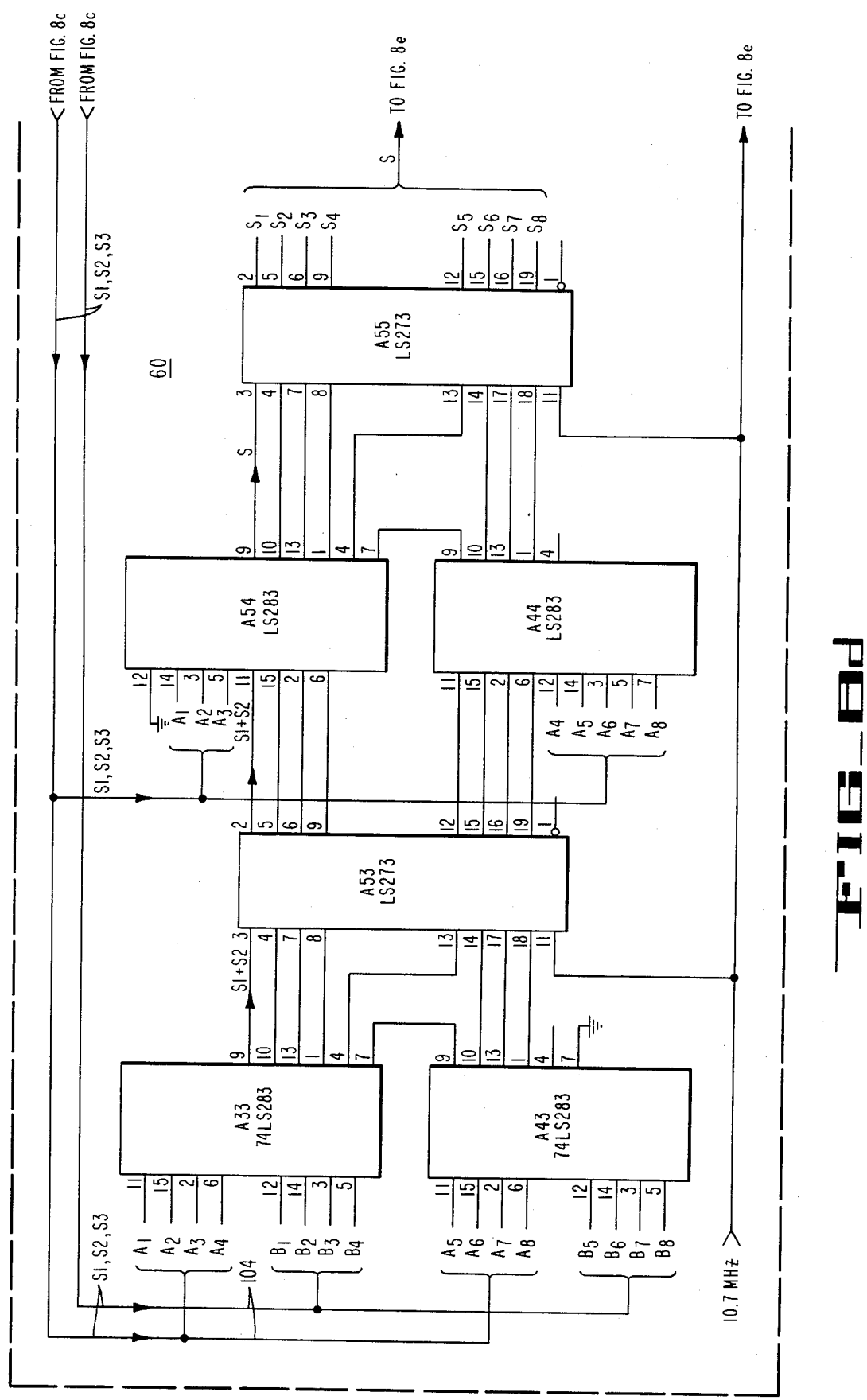

Specifically, the filter circuit 60, which is utilized to separate the luminance component from the composite color televison signal and which is shown in consecutive FIGS. 8d and 8e is similar to that disclosed in the above-indicated U.S. Pat. No. 4,251,831. It is understood, however, that a well known digital comb filter may be utilized instead. As it will be seen from the detailed circuit diagram of FIGS. 8a to 8h, it is an advantage of the digital dropout compensation circuit of the present invention that all signal processing is provided in real time utilizing standard TTL (transistor-to-transistor logic) circuitry. The circuit of the above-indicated Figures is designed for dropout compensation in a color television signal recording and reproducing system where an NTSC color television signal is encoded in digital form by sampling at a frequency equal to three times the color subcarrier frequency of the television signal, that is $f_{sampl} = 3 \times 3.58$ MHz $\simeq 10.74$ MHz. The sampling signal is phase locked to the color burst component of the subcarrier signal in a manner well known in the art. The sampling frequency is equal to the clock frequency as previously mentioned with respect to the description of FIG. 2.

Generally, for operation of the dropout compensator of the invention, the sampling frequency utilized to encode the composite analog color television signal, does not have to be the same as the clock signal frequency utilized to synchronize the various elements of the dropout compensation circuit. The samples may be received and stored, for example, at the sampling frequency, and subsequently recovered at the clock frequency, while the latter frequency is utilized for synchronization of the circuit.

Now the preferred embodiment of the invention shown in the detailed circuit diagram of FIGS. 8a to 8h will be described. In FIG. 8a, consecutive samples S1, S2, S3, etc., of the digital color television signal are received at input 90 of the dropout compensator as 8-bit parallel data by a first set of inputs 91 of two data selector/multiplexers A24 and A34 of two-way switch 52. These multiplexers also receive data at second input 92 from output 116 of delay line 56, shown in FIG. 8c. A dropout control signal DO from a conventional RF envelope level dropout detector circuit (not shown) is received by the multiplexers at 114 via input 110 and flip-flop A16. Flip-flop A16 is utilized for the common purpose to precisely clock the dropout control signal DO. In normal operations, the multiplexers apply the input data 90 via flip-flop A23 to output 93. Generally, flip-flops similar to A23 are utilized throughout entire circuit to delay the processed data by one clock cycle to assure precise data clocking. When the DO control signal at 110 is received, the output of multiplexers is switched from input 91 to input 92. The data from output 93 is fed to output 70 of the dropout compensator circuit via first controlled delay line 54 of FIG. 8b; second compensating delay line 56 of FIG. 8c; switch 58 of FIG. 8g; and a further controlled delay line 126 of FIG. 8g.

Delay line 54 of FIG. 8b comprises eight identical 4×256 bit random access memories of which six memories designated B1, B11, B31, B51, B61 and B81 are shown. Two groups of four memories each are utilized for receiving higher and lower order bits, respectively. The controlled delay line 54 has a length of delay equal to one horizontal line period of the color television signal less the compensating delay $\zeta$ provided by fixed delay line 56 of FIG. 8c coupled in the delayed color television signal path. Delay line 56 is implemented by eight shift registers, of which four registers A51, A61, A52 and A82 are shown. Flip-flop B41 at the output of delay line 54 is utilized to assure proper timing of the output data to achieve the desired delay. The delayed composite signal at output 115 is applied via fixed compensating delay line 56 to input 96 of switch 58 of FIG. 8g.

As shown in FIG. 8d, the data S1, S2, S3, etc., from output 115 of delay line 54, representing signal V, is also applied to one set of inputs 104 of filter 60. As described in the above-identified U.S. Pat. No. 4,251,831, filter 60 continuously provides an average value of three consecutive samples S1, S2, S3. As shown in FIG. 8c, a sample S1, applied via a portion of delay line 56, is obtained at output 117 thereof, where it has been delayed by one clock signal period to assure its proper timing for addition with a sample S2 received one clock signal later. The delayed sample, S2, is applied to a second set of inputs 104 of filter 60. Samples S1 and S2 are added in two 4-bit binary adders A33, A43 of FIG. 8d and their sum S1+S2 is delayed in flip-flop A53 by one clock signal in preparation for addition with the subsequently received sample S3 from output 115 of 54. The latter summation is performed by two 4-bit binary adders A54, A44 and an output signal therefrom represents the sum S=S1+S2+S3. Signal S is fed through flip-flop A55 to assure proper timing for further processing. In this particular embodiment of the invention, an average sample value is obtained by dividing signal S by 3. The division by 3 is performed with a 0.13% accuracy by an approximation algorithm:

$$\frac{S}{3} = \frac{S}{4} + \frac{S}{16} + \frac{S}{256}$$

For the particular application of averaging the samples in the presently described preferred embodiment, the approximation algorithm is implemented in two steps as follows:

$$PS = \frac{S}{4} + \frac{S}{16}$$

$$\frac{S}{3} \approx PS + \frac{PS}{16}$$

These two steps are preformed in the remaining portions of the circuit diagram of filter 60 shown in FIG. 8e as described below.

Two 4-bit binary adders A64, A65 of FIG. 8e receive the signal S at two sets of inputs, they shift the signal S in the well known manner to effect a division and generate S/4 at one of the sets of inputs, and they provide a sum of (S+S/4). The output signal from the latter adders is further shifted to obtain a divided output signal corresponding to (S+S/4)/2. The latter output signal represents twice the partial sum PS defined above. The signal 2PS is applied to flip-flop A75 which supplies signal 2PS to two sets of inputs of two 4-bit binary adders A66 and A76. The latter adders shift the signal 2PS to obtain 2PS/16 at one set of inputs and they provide an output signal corresponding to (2PS+2PS/16)/2. This output signal represents S/3 of the approximation algorithm indicated above. The obtained signal S/3 corresponds to the average value output signal provided by filter 60 in accordance with the disclosure of the above-referenced U.S. Pat. No. 4,251,831. The output signal of adders A66, A76 thus represents the chrominance-less color television signal, that is, the separated luminance component described hereinbefore with reference to FIG. 7. Signal S/3 is applied to flip-flops A67 and A77, which provide both an output S/3 indicated L' at output 105, to input 107 of switch 62, in FIG. 8f and an inverted output signal (−S/3), indicated $\overline{L'}$, at output 106 and applied to a first set of inputs 102 of adder 64 of FIG. 8f. Adder 64 is implemented by two 4-bit binary adders, A36, A46.

In this preferred embodiment, the compensating fixed delay line 113 shown in the block diagram of FIG. 7, is implemented by a portion of the fixed compensating delay line 56 at output 130 thereof, as it is shown in FIG. 8c. The thusly delayed composite color television signal from output 130 of delay line 56, indicated V', is applied to a second set of inputs 101 of two 4-bit binary adders A36, A46 of adder 64 in FIG. 8f. Adder 64 provides at output 103 an output signal indicated C', which represents the separated chrominance component, as it has been described before with reference to FIG. 7. Signal C' is applied via flip-flop A56 and A5 representing the compensating fixed delay line 68 to a first set of inputs 99 of two 4-bit binary adders A84, A85 of adder 66 in FIG. 8g. The separated delayed luminance component L is applied from the outputs 109 of multiplexers A87, A86, representing switch 62 in FIG. 8f, to the other set of inputs 98 of adder 66. As described above, the separated luminance component L' from output 105 of filter 60 in FIG. 8e is applied to one set of inputs 107 of multiplexers A87, A86. The luminance component L', which has been delayed by delay line 67, implemented by flip-flops A68, A78 shown in FIG. 8f, is applied to the other set of inputs 108 of the multiplexers representing switch 62. Multiplexers A87, A86 of FIG. 8f are controlled at input 112 by the control signal HS/2 of 7.8 kHz, received at 111, which signal has been described with reference to FIG. 7. As it has been previously disclosed with respect to block diagram of FIG. 7, in response to control signal HS/2 switch 62 applies to input 98 of signal adder 66 the separated luminance component L directly from output 105 of filter 60, or via the two-clock-cycle delay line 67, alternatively, on consecutive horizontal lines. Adder 66 of FIG. 8g combines the respective luminance and chrominance components received at its respective inputs 98, 99 into a composite color television signal, representing the dropout compensation signal. That signal is applied, via re-timing flip-flop A89 to a first set of inputs 95 of switch 58 in FIG. 8g, which is implemented by multiplexers A73, A74. On the other set of inputs 96 of multiplexers A73, A74, an output signal from delay line 56 of FIG. 8c is received. The output signal at 127 from switch 58 is applied to delay line 126 which is shown as a block. This delay line is utilized in the specific embodiment of FIGS. 8a to 8h to eliminate the undesired 180° phase shift as previously explained with reference to FIG. 7. Delay line 126 provides a one horizontal line delay and is controlled by the control signal CB, simultaneously with and in the same manner as the controlled delay line 54. Delay line 126 may be constructed utilizing random access memories similar to those of delay line 54 in FIG. 8b. The output signal of delay line 126 thus represents the output signal of the dropout compensation circuit of FIGS. 8a to 8h provided at output terminal 70.

Switch 58 of FIG. 8g is controlled by the dropout control signal DO received at input terminal 110 in FIG. 8a and applied via output 55 of delay line 53 of FIG. 8a to control input 97 of switch 58.

FIG. 8h shows a memory address generator circuit 50 providing output signals at memory address lines $A_0$ to $A_7$, of a memory address bus AB coupled to control the data flow through the respective delay lines 53, 54 shown in FIGS. 8a and 8b, respectively. In FIG. 8h counters A2, A12, A22, B2, B12 and B22 are utilized to count the respective clock cycles corresponding to the actual delay provided by these delay lines. The diagram of FIG. 8h reveals the memory address generator 150 in sufficient detail, consequently, no further disclosure is necessary.

To provide a complete disclosure of the detailed circuit, respective clock signals indicated 10.7 MHz and inverted clock signals indicated $\overline{10.7 \text{ MHz}}$ utilized for clocking various circuit elements are shown in the detailed circuit diagram of FIGS. 8a to 8h. These signals are derived in a well known manner, as described, for example, in the above-indicated U.S. Pat. No. 4,251,831.

In the foregoing specification, the preferred embodiments of the invention have been described with respect to a digital dropout compensation circuit, in which an NTSC composite color television signal is sampled at a frequency equal to three times the color subcarrier signal frequency, $F_{sampl} \approx 3 \times 3.58 \text{ MHz} = 10.74 \text{ MHz}$. As it will become apparent to those skilled in the art, the respective block diagrams of FIGS. 2, 5 and 7 could also be utilized for other digital as well as analog color television signal systems, such as NTSC, PAL, PAL-M, etc. For example, if the dropout compensation apparatus of the invention is utilized in an analog color television signal system, it may be preferably to implement the controlled delay lines, for example, delay line 3 of FIG. 2, by conventional charge-coupled devices (CCD). As it is known in the art, such devices could be utilized as delay lines for delaying signals in analog form, while the information to be delayed may be clocked in and out of the delay line in response to a control signal, similarly, as it has been disclosed with respect to the above-described embodiments. At the same time, delay lines, such as 8 and 9 of FIG. 2, may be implemented by conventional analog delay lines. In the later case, delay line 8 would provide a desired amount of the analog signal delay substantially corresponding to the line-to-line offset of the color subcarrier signal, and advantageously delay line 9 would provide substantially twice that amount of delay to achieve a desired luminance component delay modulation with respect to the chrominance component delay, as described above.

Generally, the invention with respect to FIG. 2 may be utilized in any digital color television signal system where the sampling frequency is equal to an integral multiple of the color subcarrier signal frequency. For example, if an NTSC color television signal is sampled at a frequency equal to four times the subcarrier signal frequency, then, to achieve a desired dropout compensation signal, having a proper line-to-line phase of the chrominance component, for example, by the embodiment of FIG. 2, the original signal chrominance component samples would have to be displaced on consecutive television lines by plus or minus two sampling periods. Consequently, to reduce the luminance component displacement on consecutive lines, the delay line 9 of FIG. 2 would have to provide a four clock cycle delay $4\delta$, while the delay line 8 would have to provide a two cycle delay $2\delta$.

The above disclosed invention is applicable also to PAL or PAL-M signal systems, since the respective control signals, such as signal CB, HS and HS/2, respectively, in FIGS. 2, 5 or 7 are frequency and phase locked to the incoming color television signal. It will be appreciated by those skilled in the art that the so-called one-quarter cycle offset corresponding to the 90 degree phase shift occurring in the PAL subcarrier component during consecutive television lines may be compensated for in the dropout compensator of the present invention by applying the above control signals to the respective controlled delay lines of the above-indicated embodiments, which will be loaded and unloaded on consecutive lines synchronously with the control signals of the particular signal system utilized.

As it will become apparent to those skilled in the art, alternative embodiments similar to the disclosed detailed circuit diagrams of FIGS. 8a to 8g, as well as alternative circuit elements in these embodiments, may be utilized to obtain the disclosed operation of the dropout compensator in accordance with the method of the present invention. For example, the differencing circuit 64 may be implemented as a substracting circuit to which respective signals L', V' of the same polarity are applied. Similarly, known alternative circuit elements in the summing circuit 66 may be utilized to obtain the desired combination of the chrominance and luminance components. As an alternative, different means of obtaining the delay in delay lines 54 may be utilized, such as shift registers, instead of the random access memories. Likewise, to obtain division by 3 of the samples in filter circuit 60, read only memories may be utilized instead of the disclosed circuit elements implementing the approximation algorithm.

The individual circuit elements of all the above disclosed embodiments of the invention may be implemented by conventional, standard integrated devices.

While the invention has been shown and described with particular reference to preferred and alternative embodiments thereof, it will be understood that variations and modifications in form and details may be made therein without departing from the spirit and scope of the invention as defined in the appended claims.

I claim:

1. A method of compensating color television signals for dropouts wherein a dropout interval occuring in an input color television signal is replaced by a dropout compensation signal derived from a previously occuring corresponding interval of the input color television signal including luminance and chrominance components defining consecutive horizontal lines of color television information; the steps comprising:

storing intervals of each horizontal line of the input color television signal without dropouts;

storing intervals of an immediately succeeding horizontal line of the input color television signal without dropouts in place of corresponding stored intervals of said each horizontal line;

retaining in storage corresponding stored intervals of said each horizontal line in place of intervals of said immediately succeeding horizontal line of the input color television signal when dropouts occur in said immediately succeeding horizontal line;

separating the luminance and chrominance components of the stored color television signal;

adjusting the time of storage of the stored chrominance component of successsive horizontal line intervals between a first time greater than and a second time less than an interval corresponding to one horizontal line to phase synchronize the stored chrominance component with the corresponding component included in the input color television signal;

adjusting the time of storage of the stored luminance component of successive horizontal line intervals between a third time greater than and a fourth time less than an interval corresponding to one horizontal line to reduce the phase difference between the stored luminance component and the corresponding component included in the input color television signal;

combining the adjusted chrominance and luminance components to form the dropout compensation signal; and inserting the dropout compensation signal in place of the input color television signal when a dropout occurs in said input color television signal.

2. The method of claim 1 wherein said input color television signal is a digital signal obtained by sampling the analog form of the color television signal with a sampling signal having a rate equal to an integral multiple of at least three times the frequency of the unmodulated color subcarrier frequency of the color television signal, said first time is greater than and said second time is less than said interval corresponding to one horizontal line by a first amount less than one cycle of said unmodulated color subcarrier frequency, and said third time is greater than and said fourth time is less than said interval corresponding to one horizontal line by a second amount less than one cycle of said unmodulated color subcarrier frequency.

3. The method of claim 1 wherein the color television signal is sampled at rate of three times the frequency of the unmodulated color subcarrier frequency; the intervals of a first and alternate subsequent horizontal lines of the input color television signal are stored for a first interval corresponding to one horizontal line plus one half cycle of the sampling signal prior to separating the chrominance and luminance components; the intervals of a second and alternate horizontal lines of the input color television signal are stored for a second interval corresponding to one horizontal line less two and one half cycles of the sampling signal prior to separating the chrominance and luminance components; the separated chrominance component of each horizontal line is stored for a third interval equal to one cycle of the sampling signal whereby the storage of the chrominance components of consecutive horizontal lines are adjusted by said first and second times, respectively; and the separated luminance component of said second and alternate horizontal lines is stored for a fourth interval equal to two cycles of the sampling signal whereby the storage of the luminance components of consecutive horizontal lines are adjusted by said third and fourth times, respectively.

4. The method of claim 1 wherein the color television is sampled at a rate of three times the frequency of the unmodulated color subcarrier frequency; the input color television signal is first separated into chrominance and luminance components; the separated chrominance component of a first and alternate subsequent horizontal lines are stored for a first interval corresponding to one horizontal line plus one and one half cycles of the sampling signal; the separated chrominance component of a second and alternate subsequent horizontal lines are stored for a second interval corresponding to one horizontal line less one and one half cycles of the sampling signal whereby the storage of the chrominance components of consecutive horizontal lines are adjusted by said first and second times, respectively; the separated luminance component of the first and alternate subsequent horizontal line intervals are stored for a third interval plus one half cycle of the sampling signal; and the separated luminance component of the second and alternate subsequent horizontal line intervals are stored for a fourth interval corresponding to one horizontal line interval less one half cycle of the sampling signal whereby the storage of the luminance components of consecutive horizontal lines are adjusted by said third and fourth times, respectively.

5. A dropout compensator for color television signals including luminance and chrominance components defining consecutive horizontal lines of color television information in which a dropout detection signal is generated upon the occurrence of a dropout interval in an input color television signal for controlling the replacement of said dropout interval with a corresponding interval that previously occurred in the color television signal; comprising:

memory means having an input for receiving said color television signal, said memory means having a storage capacity sufficient to store at least one horizontal line of said color television signal;

memory control means operatively associated with the memory means for effecting storage of intervals of each horizontal line received at the input of said memory means in place of corresponding intervals of an immediately preceeding horizontal line received at said input of said memory means;

first switch means for coupling the input color television signal to the input of the memory means, said first switch means responsive to said dropout detection signal to decouple said input color television signal from said input of said memory means;

means for separating the luminance and chrominance components of the stored color television signal;

means for adjusting the time of storage of the stored chrominance component of successive horizontal line intervals, said time of storage of the chrominance component adjustable between a first time greater than and a second time less than an interval corresponding to one horizontal line to phase synchronize the stored chrominance with the corresponding component included in the input color television signal;

means for adjusting the time of storage of the stored luminance component of successive horizontal line intervals, said time of storage of the luminance component adjustable between a third time greater than and a fourth time less than an interval corresponding to one horizontal line to reduce the phase difference between the stored luminance component and the corresponding component included in the input color television signal;

means for combining the adjusted chrominance and luminance components to form a composite color television dropout compensation signal; and a second switch means for selectively coupling the input color television signal and the dropout compensation signal to an output, said second switch means responsive to the dropout detection signal to couple the dropout compensation to said output, and said second switch means coupling the input color television signal to the output in the absence of the dropout detection signal.

6. The dropout compensator of claim 5 wherein said input color television signal is a digital signal obtained by sampling the analog form of the color television signal with a sampling signal having a rate equal to three times the frequency of the unmodulated subcarrier frequency of the color television signal; the memory means includes a first memory having said input coupled to said first switch means, a second memory having an input coupled to receive the separated chrominance component and a thrid memory having an input coupled to receive the separated luminance component, said second memory providing a first delay of less than one cycle of the sampling signal and said second memory providing a second delay two cycles of the sampling signal, said first memory responsive to the memory control means for storing a first and alternate subsequent horizontal lines of the input color television signal prior to coupling to the luminance and chrominance separating means for a first interval corresponding to one horizontal line plus one half cycle of the sampling signal and for storing a second and alternate subsequent horiztonal lines of the input color television signal prior to coupling to the luminance and chrominance separating means for a second interval corresponding to one horizontal line less two and one half cycles of the sampling signals; and further comprising a third switch means having one input coupled to the output of the third memory and second input coupled to receive the separated luminance component from the luminance and chrominance separating means, said third switch means responsive to the memory control means to couple to the combining means the luminance component received from the luminance and chrominance separating means during said first and alternate subsequent horizontal lines and to couple to the combining means the luminance component received from the third memory during said second and alternate subsequent horizontal lines.

7. The dropout compensator of claim 5 wherein the input color television signal is first coupled to the luminance and chrominance separating means; and said memory means includes a first memory and a second memory each having a storage capacity of at least one horizontal line, said first memory coupled to receive the separated chrominance component and said second memory coupled to receive said separated luminance component, said first memory responsive to the memory control means to provide said first and second times of storage for the chrominance component, said second memory responsive to the memory control means to provide said third and fourth times of storage.

8. A method of compensating an input color television signal for dropouts by replacing said dropouts with previously occurring portions of the input color television signal not containing dropouts, the input color television signal having consecutive horizontal lines of video information including luminance and chrominance components, each horizontal line of a selected horizontal line interval, the chrominance component modulated on a carrier signal of known frequency; the steps comprising:
  transmitting the luminance and chrominance components of the input color television signal not containing dropouts of each horizontal line of said input color television signal through a delay to provide a first interval of delay for the luminance component and a second interval of delay for the chrominance component;
  adjusting the first interval of delay for different horizontal lines of the input color television signal to times greater than and lesser than the horizontal line interval to maintain any phase difference between the delayed luminance component and the luminance component included in the input color television signal less than one half cycle of the carrier signal;
  adjusting the second interval of delay for different horizontal lines of the input color television signal to times greater than and lesser than the horizontal line interval to maintain phase coherence between the delayed chrominance component and the chrominance component included in the input color television signal; and
  inserting the delayed luminance and chrominance components in the input color television signal in place of a dropout occurring therein.

9. The method of claim 8 wherein the luminance and chrominance components included in the input color television signal are combined to define a composite video information signal, and further comprising the steps of:
  separating the luminance and chrominance components before transmitting them through a delay, said separated luminance and chrominance components transmitted through separate delays; and
  combining the separated and delayed luminance component and the separated and delayed chrominance component to form a delayed composite video information signal, the delayed composite video information signal inserted in the input color television signal.

10. The method of claim 8 wherein the luminance and chrominance components included in the input color television signal are combined to define a composite video information signal, the transmitting step includes transmitting the luminance component through a first delay and a following second delay and transmitting the chrominance component through the first delay and a following third delay, the luminance and components are combined during their transmission through said first delay, and the adjusting steps include adjusting the first and second delays with the third delay remaining fixed; and further comprising the steps of:
  separating the luminance and chrominance components after transmission through said first delay, said separated luminance component transmitted through the second delay, and said separated chrominance component transmitted through the third delay; and
  combining the separated luminance component and separated chrominance component after transmission through the second and third delays, respectively, to form a delayed composite video information signal, the delayed composite video information signal inserted in the input color television signal.

11. The method of claim 10 wherein the input color television signal in a digital signal obtained by sampling an analog color television signal at times determined by a sampling signal having a rate equal to three times the frequency of the carrier signal, the first delay is alternately adjusted on alternate horizontal lines of the input color television signal between a first selected time delay plus one and one-half cycle of the carrier signal and the first selected time delay minus one and one-half cycles of the carrier signal, the second delay is alternately adjusted on alternate horizontal lines of the input color television signal between a second selected time delay and the second selected time delay plus two cycles of the carrier signal, and the third delay has a time delay equal to the second selected time delay plus one cycle of the carrier signal.

12. The method of claim 11 wherein consecutive horizontal lines of the input color television signal contain dropouts, and the first selected time delay is adjusted by an additional time delay equal to one cycle of the carrier signal.

13. The method of claim 8 wherein consecutive horizontal lines of the input color television signal contain dropouts, and each of the first and second intervals of delay are adjusted a further interval of delay equal to one cycle of the carrier signal for each of said consecutive horizontal lines of the input color television signal containing a dropout.

* * * * *